United States Patent
Chujoh et al.

(10) Patent No.: US 11,653,016 B2
(45) Date of Patent: May 16, 2023

(54) PREDICTION IMAGE GENERATION DEVICE, MOVING IMAGE DECODING DEVICE, MOVING IMAGE ENCODING DEVICE, AND PREDICTION IMAGE GENERATION METHOD

(71) Applicants: SHARP KABUSHIKI KAISHA, Sakai (JP); FG Innovation Company Limited, Tuen Mun (HK)

(72) Inventors: Takeshi Chujoh, Sakai (JP); Tomonori Hashimoto, Sakai (JP); Tomoko Aono, Sakai (JP); Tomohiro Ikai, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 17/298,177

(22) PCT Filed: Dec. 11, 2019

(86) PCT No.: PCT/JP2019/048520
§ 371 (c)(1),
(2) Date: May 28, 2021

(87) PCT Pub. No.: WO2020/122130
PCT Pub. Date: Jun. 18, 2020

(65) Prior Publication Data
US 2022/0103853 A1    Mar. 31, 2022

(30) Foreign Application Priority Data

Dec. 12, 2018 (JP) .............................. JP2018-232640
Jan. 7, 2019 (JP) .............................. JP2019-000704

(51) Int. Cl.
*H04N 19/513*    (2014.01)
*H04N 19/105*    (2014.01)
(Continued)

(52) U.S. Cl.
CPC ......... *H04N 19/513* (2014.11); *H04N 19/105* (2014.11); *H04N 19/159* (2014.11); *H04N 19/172* (2014.11)

(58) Field of Classification Search
None
See application file for complete search history.

(56) References Cited

U.S. PATENT DOCUMENTS

2019/0045214 A1* 2/2019 Ikai .................... H04N 19/52
2020/0382795 A1* 12/2020 Zhang ................. H04N 19/59
2021/0084330 A1    3/2021 Ikai et al.

FOREIGN PATENT DOCUMENTS

WO    2017/134957 A1    8/2017

OTHER PUBLICATIONS

Benjamin Brass et al.: "Versatile Video Coding (Draft 3)", JVET-L1001, Joint Video Exploration Team JVET) of ITU-T SG 16 WP 3 and ISO/IEC JTC 1/SC 29/WG 11 12th Meeting: Macao, CN, Oct. 3-12, 2018.

(Continued)

*Primary Examiner* — Samuel D Fereja
(74) *Attorney, Agent, or Firm* — ScienBiziP, P.C.

(57) ABSTRACT

A prediction image generation method using two prediction images to generate a prediction image by a device is provided. First and second prediction image are generated. Bidirectional prediction gradient change prediction processing is performed by using a first shift value and difference values of the first and second prediction images respectively in horizontal and vertical directions to generate a first, second, third and fourth gradient images. Motion information is derived by using the first and second prediction images, the first, second, third and fourth gradient images, a second shift value, and a third shift value. Motion compensation correction value is derived by using the motion information and the first, second, third and the fourth (Continued)

gradient images. The prediction image is generated by using the first and second prediction images and the motion compensation correction value. The first, second and third shift values are respectively equal to 6, 4 and 1.

6 Claims, 16 Drawing Sheets

(51) Int. Cl.
  *H04N 19/159* (2014.01)
  *H04N 19/172* (2014.01)

(56) References Cited

OTHER PUBLICATIONS

Kiaoyu Xiu et al.: "CE9-related: Complexity Reduction and Bit-width Control for Bi-directional Optical Flow (BIO)", JVET-L0256, Joint Video Exploration Team (JVET) of ITU-T SG 16 WP 3 and ISO/IEC JTC 1/SC 29/WG 11 12th Meeting: Macao, CN, Oct. 3-12, 2018.

Xiaoyu Xiu et al., "CE9-related: A s implified design of bi-directional optical flow (BIO)", Joint Video Experts Team (JVET) of ITU-T SG 16 WP 3 and ISO/IEC JTC 1/SC 29/WG 111 2th Meeting: Macao, CN, Oct. 3-12, 2018, JVET-L0591.

Jianle Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11 13th Meeting: Marrakech, MA, Jan. 9-18, 2019, JVET-M1002-v2.

Series H: Audiovisual and Multimedia Systems Infrastructure of audiovisual services—Coding of moving Video, "Advanced video coding for generic audiovisual services", ITU-T H.264 (Apr. 2017).

Series H: Audiovisual and Multimedia Systems Infrastructure of audiovisual services—Coding of moving video, "High efficiency video coding", ITU-T H.265 (Dec. 2016).

LG Electronics Inc. "Non-CE4: Corrections on parameter calculation for PROF and BDOF", Joint Video Experts Team (JVET) of ITU-T SG 16 WP 3 and ISO/IECJTC 1/SC 29/WG 11 16th Meeting: Geneva, CH, Oct. 1-11, 2019, JVET-P0281-rl.

* cited by examiner

PREDICTION IMAGE GENERATION DEVICE, MOVING IMAGE DECODING DEVICE, MOVING IMAGE ENCODING DEVICE, AND PREDICTION IMAGE GENERATION METHOD

CROSS-REFERENCE TO RELATED APPLICATION(S)

This present disclosure is a national stage application of International Patent Application PCT/JP2019/048520, filed on Dec. 11, 2019, now published as WO2020/122130, which claims the benefit of and priority to JP Patent Application Serial No. 2018-232640, filed on Dec. 12, 2018 and JP Patent Application Serial No. 2019-000704, filed on Jan. 7, 2019. The contents of JP Patent Applications 2018-232640 and 2019-000704, and International Patent Application PCT/JP2019/048520 are hereby incorporated fully by reference into the present disclosure.

TECHNICAL FIELD

Embodiments of the present invention relate to a prediction image generation device, a moving image decoding device, a moving image encoding device, and a prediction image generation method.

BACKGROUND

For the purposes of transmitting or recording moving images efficiently, a moving image encoding device is used to generate encoded data by encoding a moving image, and a moving image decoding device is used to generate a decoded image by decoding the encoded data.

Specific moving image encoding schemes include, for example, H.264/AVC, High-Efficiency Video Coding (HEVC), etc.

In such moving image encoding schemes, images (pictures) forming a moving image are managed by a hierarchical structure, and are encoded/decoded for each CU, wherein the hierarchical structure includes slices acquired by splitting the images, Coding Tree Units (CTUs) acquired by splitting the slices, coding units (sometimes also referred to as Coding Units (CUs)) acquired by splitting the coding tree units, and Transform Units (TUs) acquired by splitting the coding units.

In addition, in such moving image encoding schemes, sometimes, a prediction image is generated on the basis of local decoded images acquired by encoding/decoding input images, and prediction errors (sometimes also referred to as "difference images" or "residual images") acquired by subtracting the prediction image from the input images (original images) are encoded. Prediction image generation methods include inter-picture prediction (inter-frame prediction) and intra-picture prediction (intra-frame prediction).

Further, moving image encoding and decoding technologies of recent years include non-patent document 1. Non-patent document 2 discloses a BIO technique in which gradient images are used to improve image quality during derivation of a prediction image from motion compensation (interpolation image) employing bidirectional prediction.

PRIOR ART DOCUMENTS

Non-Patent Documents

Non-patent document 1: "Versatile Video Coding (Draft 3)", JVET-L1001, Joint Video Exploration Team JVET) of ITU-T SG 16 WP 3 and ISO/IEC JTC 1/SC 29/WG 11, 2018

Non-patent document 2: "CE9-related: Complexity Reduction and Bit-width Control for Bi-directional Optical Flow (BIO)", JVET-L0256, Joint Video Exploration Team (JVET) of ITU-T SG 16 WP 3 and ISO/IEC JTC 1/SC 29/WG 11, 2018

SUMMARY

Problems to be Solved by the Invention

In addition to comprising a specific pixel bit length, prediction employing BIO processing (BIO prediction) in non-patent document 2 in which gradient images are used to improve image quality during derivation of a prediction image has reduced encoding efficiency. In addition, in the BIO processing, units for reading blocks occur repeatedly; therefore, filling processing needs to be performed outside the coding units.

Technical Solutions

The moving image decoding device according to one solution of the present invention is characterized by: using, from two interpolation images, bidirectional gradient change processing in which a prediction image is generated according to a gradient change, and having a prediction image generation portion having: an L0, L1 prediction generation portion, wherein in the bidirectional gradient change processing, an L0 prediction image and an L1 prediction image for each coding unit are generated from the two interpolation images; a gradient image generation portion, for generating four gradient images in a horizontal direction and a vertical direction from the L0 prediction image and L1 prediction image; a relevant parameter calculation portion, for calculating relevant parameters of each processing unit according to product and sum operation on the L0 prediction image, the L1 prediction image, and the four gradient images; a motion compensation correction value derivation portion, for deriving, from the gradient images and the relevant parameters, a value for correcting a bidirectional prediction image; and a bidirectional prediction image generation portion, for generating a prediction image according to the L0 prediction image, the L1 prediction image, and the motion compensation correction value, wherein in the gradient image generation portion and the relevant parameter calculation portion, in order to control calculation accuracy of the calculation of relevant parameters to be less than a certain value, an internal bit length is configured, the internal bit length is configured to be less than the maximum pixel bit length that can be decoded by the decoding device, and the values of the L0 prediction image, the L1 prediction image, and the gradient prediction images are right-shifted according to the internal bit length.

In addition, the moving image decoding device according to one solution of the present invention is characterized in that in the motion compensation correction value derivation portion, in order to control calculation accuracy of the calculation to be less than a certain value, clipping processing in a value corresponding to the internal bit length is performed.

Beneficial Effect

According to the above configurations, any one of the problems described above can be solved.

DETAILED DESCRIPTION

First Embodiment

Embodiments of the present invention are described below with reference to the accompanying drawings.

Figure 1:
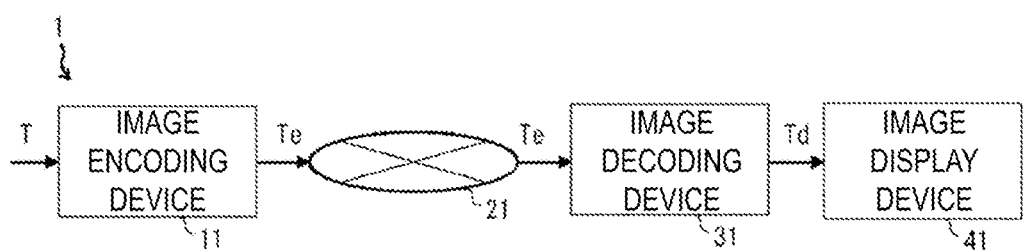
FIG. 1 is a schematic diagram showing components of an image transmission system according to this embodiment.

FIG. 1 is a schematic diagram showing components of an image transmission system 1 according to this embodiment.

The image transmission system 1 is a system for transmitting an encoded stream acquired by encoding an encoding object image, decoding the transmitted encoded stream, and displaying an image. Components of the image transmission system 1 include: a moving image encoding device (image encoding device) 11, a network 21, a moving image decoding device (image decoding device) 31, and a moving image display device (image display device) 41.

An image T is inputted to the moving image encoding device 11.

The network 21 transmits encoded streams Te generated by the moving image encoding device 11 to the moving image decoding device 31. The network 21 is the Internet, a Wide Area Network (WAN), a Local Area Network (LAN), or a combination thereof. The network 21 is not necessarily limited to a bidirectional communication network, and may be a unidirectional communication network for transmitting broadcast waves such as terrestrial digital broadcasting and satellite broadcasting. In addition, the network 21 may also be replaced with a storage medium in which the encoded streams Te are recorded, such as Digital Versatile Disc (DVD, registered trademark), Blu-ray Disc (BD, registered trademark), etc.

The moving image decoding device 31 decodes the encoded streams Te transmitted by the network 21 respectively to generate one or a plurality of decoded images Td.

The moving image display device 41 displays all of or part of the one or the plurality of decoded images Td generated by the moving image decoding device 31. The moving image display device 41 includes, for example, display apparatuses such as a liquid crystal display, an organic Electro-Luminescence (EL) display, etc. The display may be in the form of, for example, a stationary display, a mobile display, an HMD, etc. In addition, when the moving image decoding device 31 has high processing capabilities, an image having high image quality is displayed, and when the moving image decoding device 31 has only relatively low processing capabilities, an image not requiring high processing capabilities and high display capabilities is displayed.

<Operator>

The operators used in this specification are described below.

>> denotes right-shift; << denotes left-shift; & denotes bitwise AND; | denotes bitwise OR; |=denotes an OR assignment operator; || denotes logical sum.

x?y:z is a ternary operator for taking y if x is true (other than 0) and taking z if x is false (0).

Clip3(a, b, c) is a function for clipping c to a value equal to or greater than a and equal to or less than b, and returning a if c<a, returning b if c>b, and returning c otherwise (where a<=b).

abs(a) is a function for returning the absolute value of a.

Int(a) is a function for returning the integer value of a.

floor(a) is a function for returning the greatest integer equal to or less than a.

ceil(a) is a function for returning the least integer equal to or greater than a.

a/d denotes division of a by d (chop off decimal).

a^b denotes a to the power of b.

sign(a) is a function for returning the sign of a. sign(a)=a>0?1:a==0?0:−1.

log 2(a) is a function for returning the logarithm of a to base 2.

Max(a, b) is a function for returning a if a>=b and returning b if a<b.

Min(a, b) is a function for returning a if a<=b and returning b if a>b.

Round(a) is a function for returning a rounded value of a. Round(a)=sign(a)×floor(abs(a)+0.5).

<Structure of the Encoded Stream Te>

Prior to detailed description of the moving image encoding device 11 and the moving image decoding device 31 according to this embodiment, a data structure of the encoded stream Te generated by the moving image encoding device 11 and decoded by the moving image decoding device 31 is described.

Figure 4:
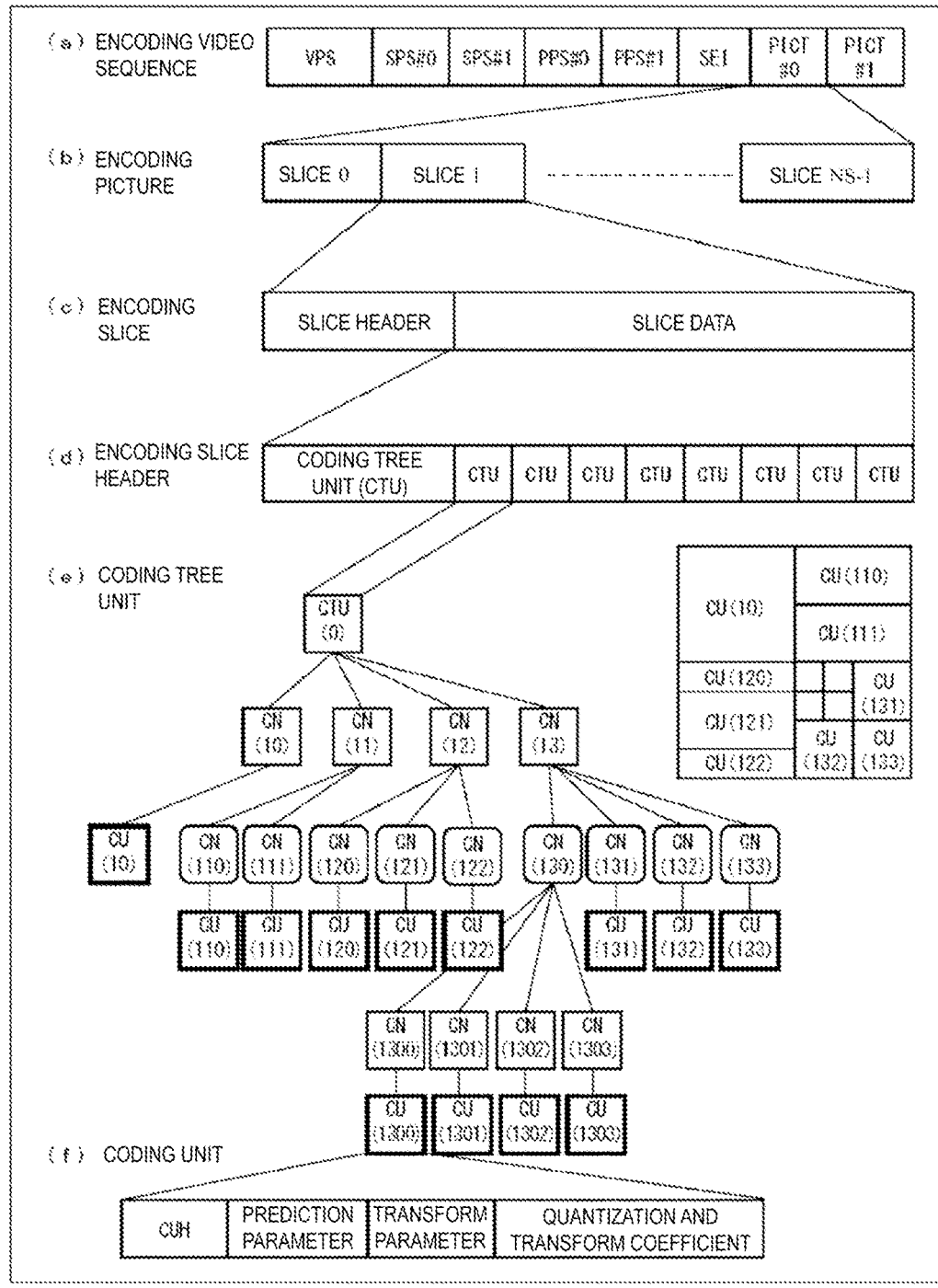
FIG. 4 is a diagram showing a hierarchical structure of data in an encoded stream.

FIG. 4 is a diagram showing a hierarchical structure of data in the encoded stream Te. The encoded stream Te exemplarily includes a sequence and a plurality of pictures forming the sequence. Parts (a)-(f) in FIG. 4 are diagrams respectively illustrating an encoding video sequence of a default sequence SEQ, an encoding picture defining a picture PICT, an encoding slice defining a slice S, encoding slice data defining slice data, a coding tree unit included in the encoding slice data, and a coding unit included in the coding tree unit.

(Encoding Video Sequence)

In the encoding video sequence, a set of data to be referred to by the moving image decoding device 31 in order to decode the sequence SEQ of a processing object is defined. The sequence SEQ is shown in (a) of FIG. 4, and includes a video parameter set, a Sequence Parameter Set (SPS), a Picture Parameter Set (PPS), a picture PICT, and Supplemental Enhancement Information (SEI).

In the video parameter set VPS, in a moving image formed by a plurality of layers, a set of encoding parameters common to a plurality of moving images, a plurality of layers included in the moving image, and a set of encoding parameters related to each of the layers are defined.

In the sequence parameter set SPS, a set of encoding parameters referred to by the moving image decoding device 31 in order to decode an object sequence are defined. For example, the width and the height of a picture are defined. It should be noted that there may be a plurality of SPSs. In this case, any one of the plurality of SPSs is selected from the PPS.

In the picture parameter set PPS, a set of encoding parameters referred to by the moving image decoding device 31 in order to decode each picture in the object sequence are defined. For example, a reference value (pic_init_qp_minus26) of a quantization width for decoding of the picture and a flag (weighted_pred_flag) for indicating application of weighted prediction are included. It should be noted that there may be a plurality of PPSs. In this case, any one of the plurality of PPSs is selected from each picture in the object sequence.

(Encoding Picture)

In the encoding picture, a set of data referred to by the moving image decoding device 31 in order to decode the picture PICT of the processing object is defined. The picture PICT is shown in (b) of FIG. 4, and includes slice 0 to slice NS-1 (NS is the total number of slices included in the picture PICT).

It should be noted that in the following description, when it is no need to distinguish between slice 0 to slice NS-1, subscripts of the numerals may be omitted. In addition, other pieces of data included in the encoded stream Te and having a subscript to be described below follow the same rules.

(Encoding Slice)

In the encoding slice, a set of data referred to by the moving image decoding device 31 in order to decode a slice S of the processing object is defined. The slice is shown in (c) of FIG. 4, and includes a slice header and slice data.

The slice header includes an encoding parameter group referred to by the moving image decoding device 31 in order to determine a decoding method of an object slice. Slice type designation information (slice_type) for designating a slice type is an example of an encoding parameter included in the slice header.

Examples of slice types that can be designated by the slice type designation information include (1) I slice using only intra-frame prediction during encoding, (2) P slice using unidirectional prediction or intra-frame prediction during encoding, (3) B slice using unidirectional prediction, bidirectional prediction, or intra-frame prediction during encoding, and the like. It should be noted that the inter-frame prediction is not limited to unidirectional prediction and bidirectional prediction, and more reference pictures can be used to generate a prediction image. P slice and B slice used hereinafter refer to a slice including a block on which inter-frame prediction can be used.

It should be noted that the slice header may also include a reference (pic_parameter_set_id) to the picture parameter set PPS.

(Encoding Slice Data)

In the encoding slice data, a set of data referred to by the moving image decoding device 31 in order to decode slice data of the processing object is defined. The slice data is shown in (d) of FIG. 4, and includes a CTU. The CTU is a block of a fixed size (for example, 64×64) forming a slice, and is also referred to as a Largest Coding Unit (LCU).

(Coding Tree Unit)

In (e) of FIG. 4, a set of data referred to by the moving image decoding device 31 in order to decode the CTU of the processing object is defined. The CTU is split by recursive Quad Tree (QT) split, Binary Tree (BT) split, or Ternary Tree (TT) split into coding units CU serving as a basic unit of encoding processing. The BT split and the TT split are collectively referred to as Multi Tree (MT) split. Nodes of a tree structure acquired by means of recursive quad tree split are referred to as coding nodes. Intermediate nodes of a quad tree, a binary tree, and a ternary tree are coding nodes, and the CTU itself is also defined as a highest coding node.

A CT includes the following information used as CT information: a QT split flag (qt_split_cu_flag) for indicating whether to perform QT split, an MT split flag (mtt_split_cu_flag) for indicating whether MT split exists, an MT split direction (mtt_split_cu_vertical_flag) for indicating a split direction of the MT split, and an MT split type (mtt_split_cu_binary_flag) for indicating a split type of the MT split. qt_split_cu_flag, mtt_split_cu_vertical_flag, and mtt_split_cu_binary_flag are transmitted for each coding node.

Figure 5:
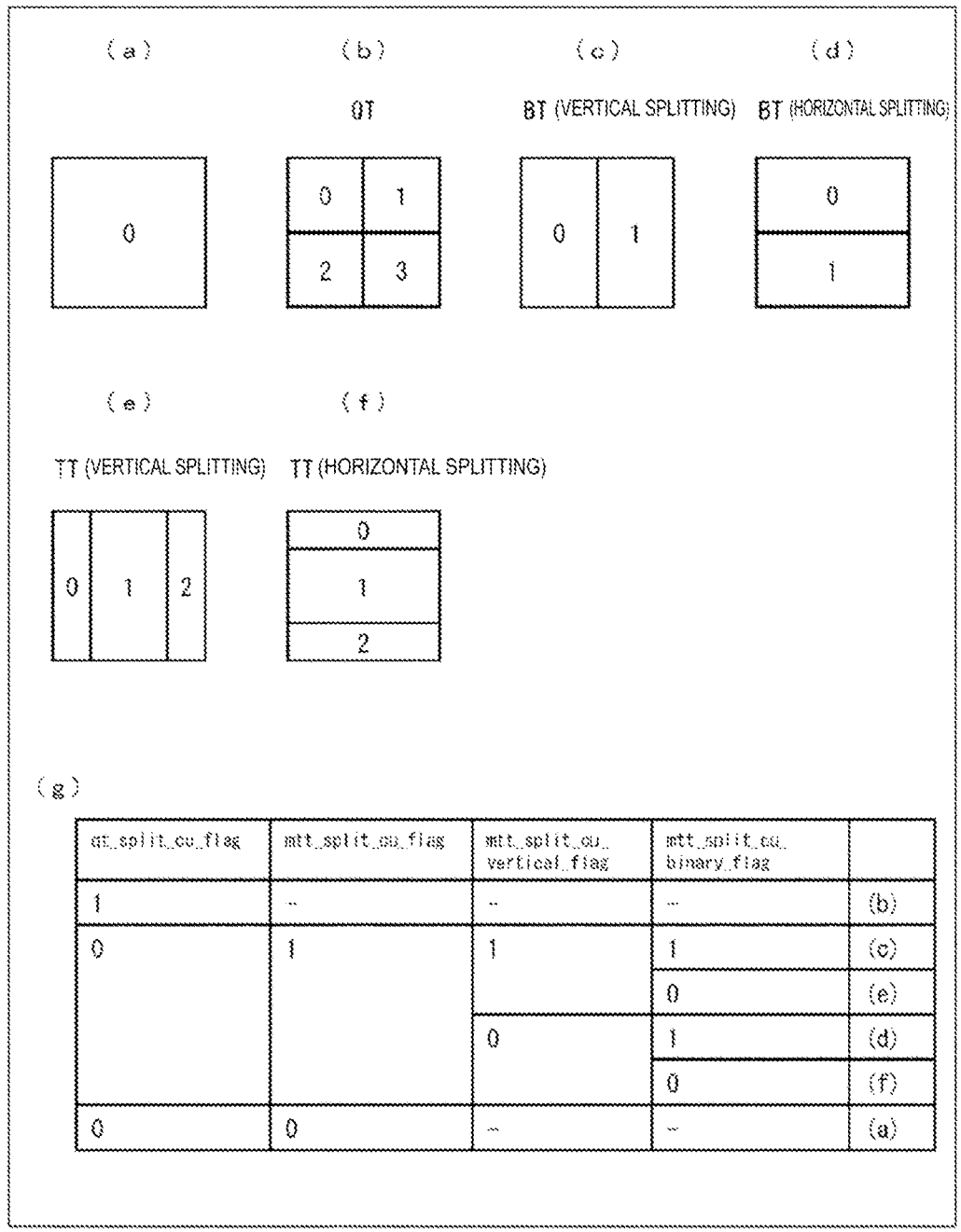
FIG. 5 is a diagram showing an example of CTU splitting.

FIG. 5 is a diagram showing an example of CTU splitting. When qt_split_cu_flag is 1, the coding node is split into four coding nodes ((b) of FIG. 5).

When qt_split_cu_flag is 0, and mtt_split_cu_flag is 0, the coding node is not split, and one CU is maintained as a node ((a) of FIG. 5). The CU is an end node of the coding nodes, and is not subjected to further splitting. The CU is a basic unit of the encoding processing.

When mtt_split_cu_flag is 1, MT split is performed on the coding node as follows. When mtt_split_cu_vertical_flag is 0, and mtt_split_cu_binary_flag is 1, the coding node is horizontally split into two coding nodes ((d) of FIG. 5); when mtt_split_cu_vertical_flag is 1, and mtt_split_cu_binary_flag is 1, the coding node is vertically split into two coding nodes ((c) of FIG. 5). Furthermore, when mtt_split_cu_vertical_flag is 0, and mtt_split_cu_binary_flag is 0, the coding node is horizontally split into three coding nodes ((f) of FIG. 5); when mtt_split_cu_vertical_flag is 1, and mtt_split_cu_binary_flag is 0, the coding node is vertically split into three coding nodes ((e) of FIG. 5). These splits are illustrated in (g) of FIG. 5.

In addition, when the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

(Coding Unit)

As shown in (f) of FIG. 4, a set of data referred to by the moving image decoding device 31 in order to decode the coding unit of the processing object is defined. Specifically, the CU consists of a CU header CUH, prediction parameters, transform parameters, quantization and transform coefficients, etc. In the CU header, a prediction mode and the like are defined.

Prediction processing may be performed for each CU, and may be performed for each sub-CU acquired by further splitting the CU. When the CU and the sub-CU have the same size, one sub-CU is included in the CU. When the CU has a size larger than the size of the sub-CU, the CU is split into sub-CUs. For example, when the CU is 8×8 and the sub-CU is 4×4, the CU is split into four sub-CUs with two horizontal splits and two vertical splits.

Prediction types (prediction modes) include intra-frame prediction and inter-frame prediction. The intra-frame prediction is prediction in the same picture, and the inter-frame prediction refers to prediction processing performed between mutually different pictures (for example, between display time points).

Processing in transform/quantization portion is performed for each CU, but the quantization and transform coefficient may also be subjected to entropy coding for each sub-block of 4×4 and the like.

(Prediction Parameters)

The prediction image is derived by prediction parameters associated with the block. The prediction parameters include prediction parameters for the intra-frame prediction and the inter-frame prediction.

The prediction parameters for the inter-frame prediction are described below. The inter-frame prediction parameters consist of prediction list use flags predFlagL0 and predFlagL1, reference picture indices refIdxL0 and refIdxL1, and motion vectors mvL0 and mvL1. The prediction list use flags predFlagL0 and predFlagL1 are flags for indicating whether reference picture lists respectively referred to as an L0 list and an L1 list are used, and a corresponding reference picture list is used when the value of the prediction list use flag is 1. It should be noted that in the present specification, when "a flag for indicating whether XX" is described, a flag other than 0 (for example, 1) indicates XX, and a flag equal to 0 indicates not XX; in logical negation, logical product, and the like, 1 is treated as true, and 0 is treated as false (the same rules are used below). However, other values may be used as the true value or the false value in an actual device and method.

Syntax elements for deriving the inter-frame prediction parameters include, for example, an affine flag affine_flag, a merge flag merge_flag, a merge index merge_idx, an inter-frame prediction identifier inter_pred_idc, a reference picture index refIdxLX, a prediction vector index mvp_LX_idx, a difference vector mvdLX, and a motion vector accuracy mode amvr_mode.

(Reference Picture List)

Figure 6:
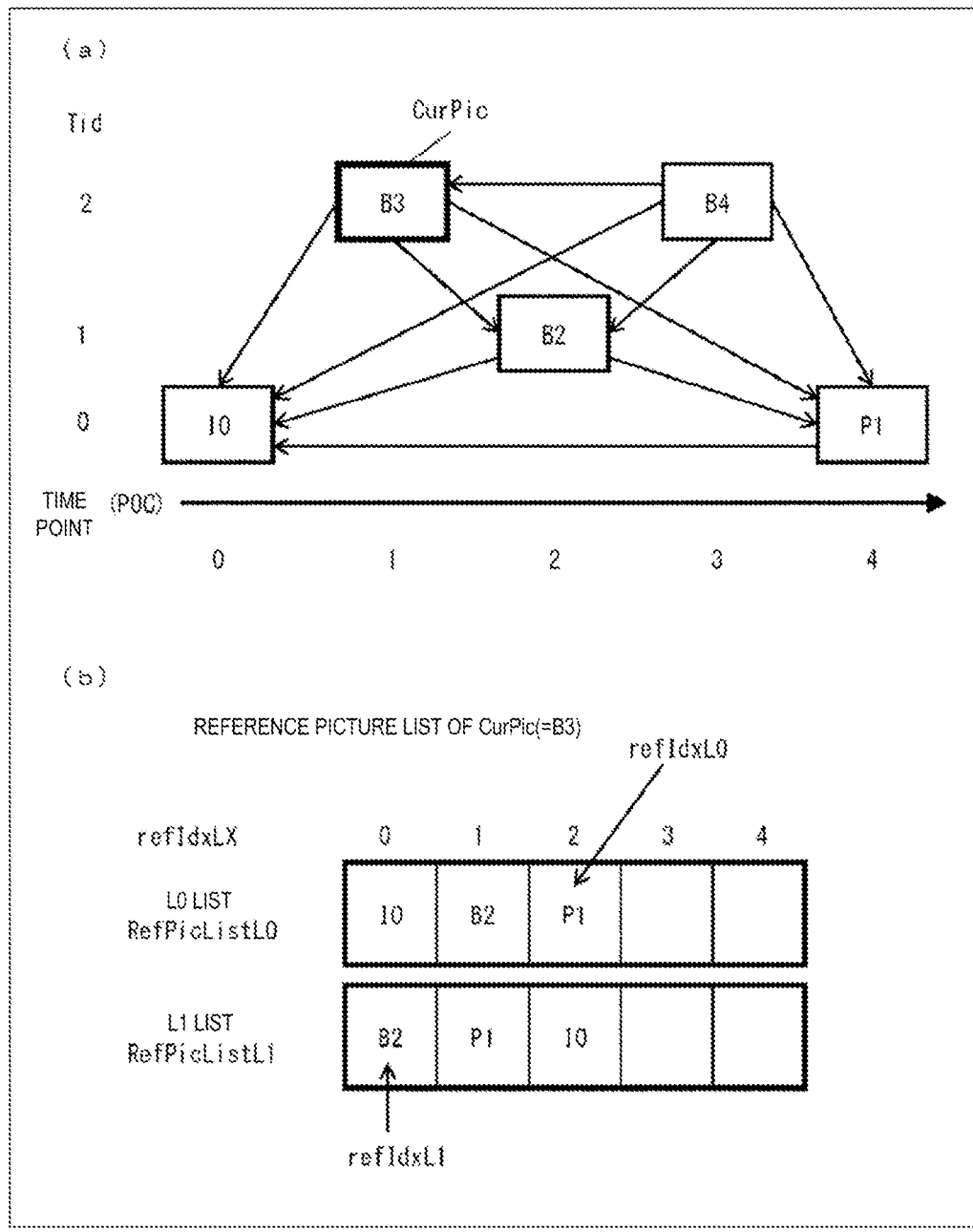
FIG. 6 is a conceptual diagram showing an example of a reference picture and a reference picture list.

The reference picture list is a list consisting of reference pictures stored in a reference picture memory 306. FIG. 6 is a conceptual diagram showing an example of a reference picture and a reference picture list. In (a) of FIG. 6, the rectangle denotes a picture, the arrow denotes a reference relation of the picture, the horizontal axis denotes time, I, P, and B in the rectangle respectively denote an intra-frame picture, a unidirectional prediction picture, and a bidirectional prediction picture, and the numbers in the rectangle denote a decoding order. As shown in (a) of FIG. 6, a picture decoding order is I0, P1, B2, B3, B4, and a picture display order is I0, B3, B2, B4, P1. (b) of FIG. 6 shows an example of a reference picture list of the picture B3 (object picture). The reference picture list is a list denoting candidates of the reference pictures, and one picture (slice) may have one or more reference picture lists. In the example in the figure, the object picture B3 has two reference picture lists, namely an L0 list RefPicList0 and an L1 list RefPicList1. In each CU, the reference picture index refIdxLX designates one picture in the reference picture list RefPicListX (X=0 or 1) actually used for reference. The figure shows an example where refIdxL0=2 and refIdxL1=0. It should be noted that LX is a description method used in the case in which the L0 prediction and the L1 prediction are not distinguished, and in the following, parameters for the L0 list and parameters for the L1 list is distinguished by replacing LX with L0 and L1.

(Merge Prediction and AMVP Prediction)

Prediction parameter decoding (encoding) methods include a merge prediction (merge) mode and an Advanced Motion Vector Prediction or Adaptive Motion Vector Prediction (AMVP) mode, and the merge flag merge_flag is for identifying the same. The merge prediction mode is a mode for deriving from the prediction parameters of a processed neighboring block and using the same without including the prediction list use flag predFlagLX (or the inter-frame prediction identifier inter_pred_idc), the reference picture index refIdxLX, and the motion vector mvLX in the encoded data. The AMVP mode is a mode in which the inter-frame prediction identifier inter_pred_idc, the reference picture index refIdxLX, and the motion vector mvLX are included in the encoded data. It should be noted that the motion vector mvLX is encoded as a prediction vector index mvp_LX_idx for identifying the prediction vector mvpLX, a difference vector mvdLX, and a motion vector accuracy mode amvr_mode. In addition, in addition to the merge prediction mode, an affine prediction mode in which identification is performed by means of the affine flag affine_flag may also be used. Implementations of the merge prediction mode include a skip mode in which identification is performed by means of a skip flag skip_flag. It should be noted that the skip mode refers to a mode in which prediction parameters are derived and used by the same method used in the merge mode and a prediction error (residual image) is not included in the encoded data. That is, when the skip flag skip_flag is 1, an object CU includes only the skip flag skip_flag, the merge index merge_idx, and other syntax associated with the merge mode, and the motion vector and the like are not included in the encoded data. Therefore, when the object CU instructs the skip flag skip_flag to use the skip mode, decoding of prediction parameters other than the skip flag skip_flag is not performed.

(Motion Vector)

The motion vector mvLX denotes an amount of deviation between blocks on two different pictures. A prediction vector and a difference vector related to the motion vector mvLX are respectively referred to as a prediction vector mvpLX and a difference vector mvdLX.

(Inter-Frame Prediction Identifier inter_pred_idc and Prediction List Use Flag predFlagLX)

The inter-frame prediction identifier inter_pred_idc is a value for indicating the types and the number of reference pictures, and takes any value of PRED_L0, PRED_L1, and PRED_BI. PRED_L0 and PRED_L1 respectively indicate that unidirectional prediction of a reference picture managed in the L0 list is used and that unidirectional prediction of a reference picture managed in the L1 list is used. PRED_BI indicates that bidirectional prediction BiPred of two reference pictures managed in the L0 list and the L1 list is used.

The merge index merge_idx is an index indicating whether any one of prediction parameters in prediction parameter candidates (merge candidates) derived from a block on which processing has been completed is used as a prediction parameter of an object block.

A relationship between the inter-frame prediction identifier inter_pred_idc and the prediction list use flags predFlagL0 and predFlagL1 can be mutually converted as follows.

inter_pred_idc=(predFlag$L$1<<1)+predFlag$L$0 predFlagL0=inter_pred_idc&1 predFlagL1=inter_pred_idc>>1

(Determination on Bidirectional Prediction biPred)

A flag biPred for determining bidirectional prediction biPred can be derived depending on whether two prediction list use flags are both 1. For example, derivation can be performed by means of the following equation.

biPred=(predFlagL0==1&&predFlagL1==1)

Alternatively, the flag biPred can also be derived depending on whether the inter-frame prediction identifier is a value indicating that two prediction lists (reference pictures) are used. For example, derivation can be performed by means of the following equation.

biPred=(inter_pred_idc==PRED_BI)?1:0

(Components of the Moving Image Decoding Device)

Figure 7:
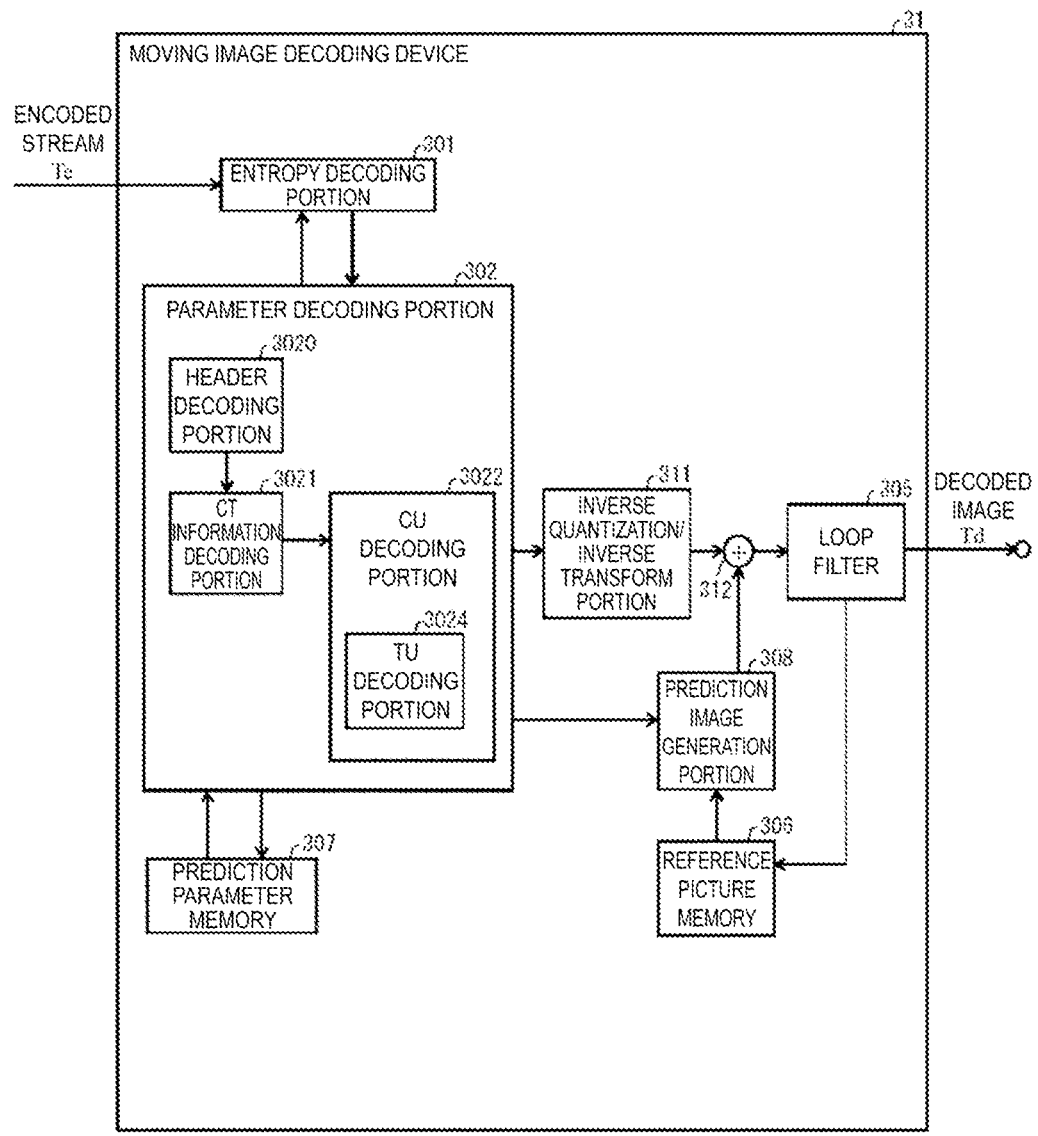
FIG. 7 is a schematic diagram showing components of a moving image decoding device.

Components of the moving image decoding device 31 (FIG. 7) according to this embodiment are described.

The components of the moving image decoding device 31 include: an entropy decoding portion 301, a parameter decoding portion (prediction image decoding device) 302, a loop filter 305, a reference picture memory 306, a prediction parameter memory 307, a prediction image generation portion (prediction image generation device) 308, an inverse quantization/inverse transform portion 311, and an addition portion 312. It should be noted that according to the moving image encoding device 11 described below, the moving image decoding device 31 may not include the loop filter 305.

The parameter decoding portion 302 further includes a header decoding portion 3020, a CT information decoding portion 3021, and a CU decoding portion 3022 (prediction mode decoding portion) not shown in the figure, and the CU decoding portion 3022 further includes a TU decoding portion 3024. The above components can also be collectively referred to as a decoding module. The header decoding portion 3020 decodes parameter set information such as the VPS, the SPS, and the PPS and the slice header (slice information) from the encoded data. The CT information decoding portion 3021 decodes the CT from the encoded data. The CU decoding portion 3022 decodes the CU from the encoded data. When the TU includes the prediction error, the TU decoding portion 3024 decodes QP update information (quantization correction value) and a quantization prediction error (residual_coding) from the encoded data.

In addition, the parameter decoding portion 302 is configured to include an inter-frame prediction parameter decoding portion (prediction image generation device) 303 and an intra-frame prediction parameter decoding portion 304 not shown in the figure. The prediction image generation portion 308 is configured to include an inter-frame prediction image generation portion (prediction image generation device) 309 and an intra-frame prediction image generation portion 310.

In addition, an example in which the CTU and the CU are used as processing units is described below; however, the processing is not limited thereto, and processing may also be performed in units of sub-CUs. Alternatively, the CTU and the CU may be replaced with blocks, and the sub-CU may be replaced with a sub-block; processing may be performed in units of blocks or sub-blocks.

The entropy decoding portion 301 performs entropy decoding on the encoded stream Te inputted from the external, and decodes each code (syntax element).

The entropy decoding portion 301 outputs the decoded code to the parameter decoding portion 302. The decoded code is, for example, the prediction mode predMode, the merge flag merge_flag, the merge index merge_idx, the inter-frame prediction identifier inter_pred_idc, the reference picture index refIdxLX, the prediction vector index mvp_LX_idx, the difference vector mvdLX, the motion vector accuracy mode amvr_mode, etc. Control of which code to decode is performed on the basis of an instruction of the parameter decoding portion 302.

(Components of the Inter-Frame Prediction Parameter Decoding Portion)

The inter-frame prediction parameter decoding portion 303 decodes the inter-frame prediction parameter by referring to the prediction parameter stored in the prediction parameter memory 307 and on the basis of the code inputted from the entropy decoding portion 301. In addition, the inter-frame prediction parameter decoding portion 303 outputs the decoded inter-frame prediction parameter to the prediction image generation portion 308, and stores the same in the prediction parameter memory 307.

Figure 8:
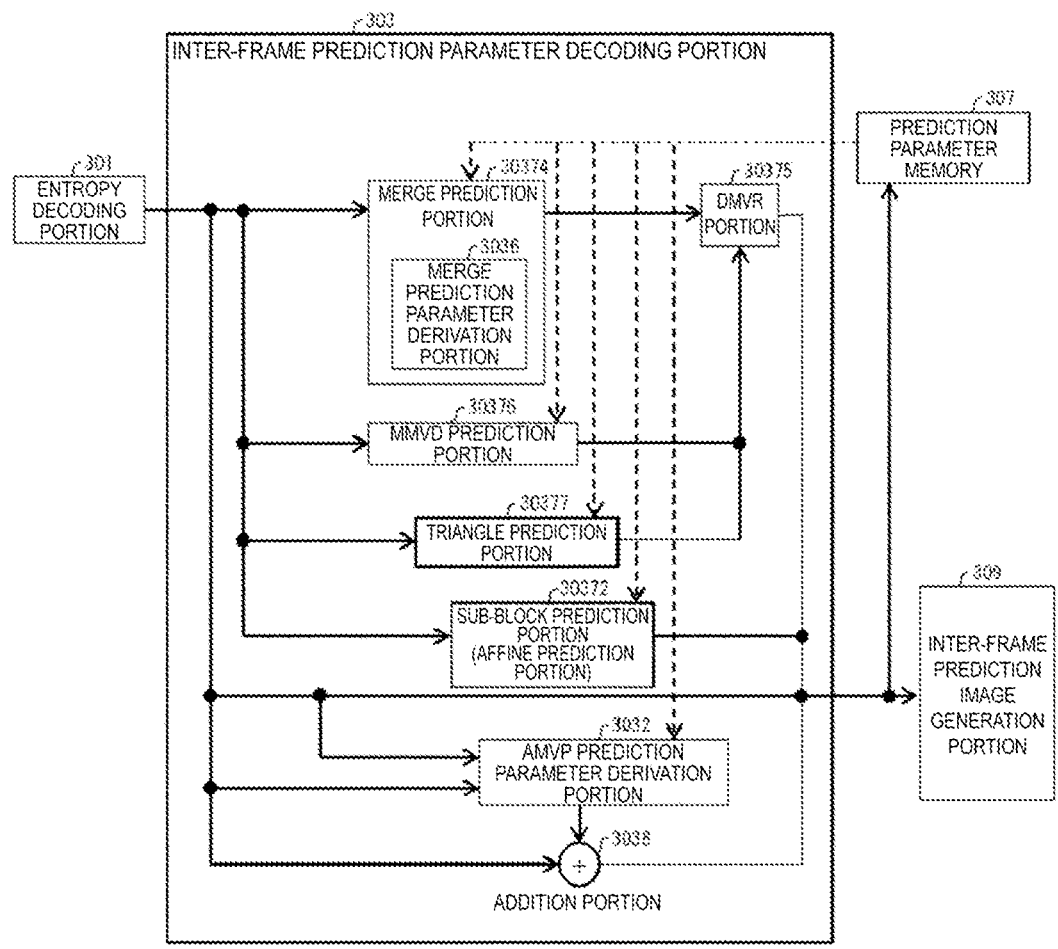
FIG. 8 is a schematic diagram showing components of an inter-frame prediction parameter decoding portion.

FIG. 8 is a schematic diagram showing the components of the inter-frame prediction parameter decoding portion 303 according to this embodiment. The inter-frame prediction parameter decoding portion 303 is configured to include: a merge prediction portion 30374, a DMVR portion 30375, a sub-block prediction portion (affine prediction portion) 30372, an MMVD prediction portion (motion vector derivation portion) 30376, a triangle prediction portion 30377, an AMVP prediction parameter derivation portion 3032, and an addition portion 3038. The merge prediction portion 30374 is configured to include a merge prediction parameter derivation portion 3036. The AMVP prediction parameter derivation portion 3032, the merge prediction parameter derivation portion 3036, and the affine prediction portion 30372 are commonly used in a moving image encoding device and a moving image decoding device, and therefore, these components can also be collectively referred to as a motion vector derivation portion (motion vector derivation device).

The inter-frame prediction parameter decoding control portion 303 instructs the entropy decoding portion 301 to decode syntax elements associated with the inter-frame prediction to extract the syntax elements included in the encoded data, and the syntax elements are, for example, the affine flag affine_flag, the merge flag merge_flag, the merge index merge_idx, the inter-frame prediction identifier inter_pred_idc, the reference picture index refIdxLX, the prediction vector index mvp_LX_idx, the difference vector mvdLX, and the motion vector accuracy mode amvr_mode.

When the affine flag affine_flag is 1, namely, in the affine prediction mode, the affine prediction portion 30372 derives the inter-frame prediction parameter of the sub-block.

When the merge flag merge_flag is 1, namely, in the merge prediction mode, the merge index merge_idx is decoded and outputted to the merge prediction parameter derivation portion 3036.

When the merge flag merge_flag is 0, namely, in the AMVP prediction mode, examples of AMVP prediction parameters including the inter-frame prediction identifier inter_pred_idc, the reference picture index refIdxLX, the prediction vector index mvp_1X_idx, and the difference vector mvdLX are decoded. The AMVP prediction parameter derivation portion 3032 derives the prediction vector mvpLX according to the prediction vector index mvp_LX_idx. In the addition portion 3038, the derived prediction vector mvpLX is added to the difference vector mvdLX so as to derive the motion vector mvLX.

(Affine Prediction Portion)

The affine prediction portion 30372 derives affine prediction parameters of the object block. In this embodiment, as the affine prediction parameter, motion vectors (mv0_x, mv0_y) and (mv1_x, mv1_y) of two control points (V0, V1) of the object block are derived. Specifically, the motion vector of each control point can be derived by performing prediction according to a motion vector of a block adjacent to the object block; alternatively, the motion vector of each control point may also be derived from the sum of a prediction vector derived as the motion vector of the control point and the difference vector derived from the encoded data.

It should be noted that the affine prediction portion 30372 may appropriately derive parameters for 4-parameter MVD affine prediction or 6-parameter MVD affine prediction.

(Merge Prediction)

Figure 9:
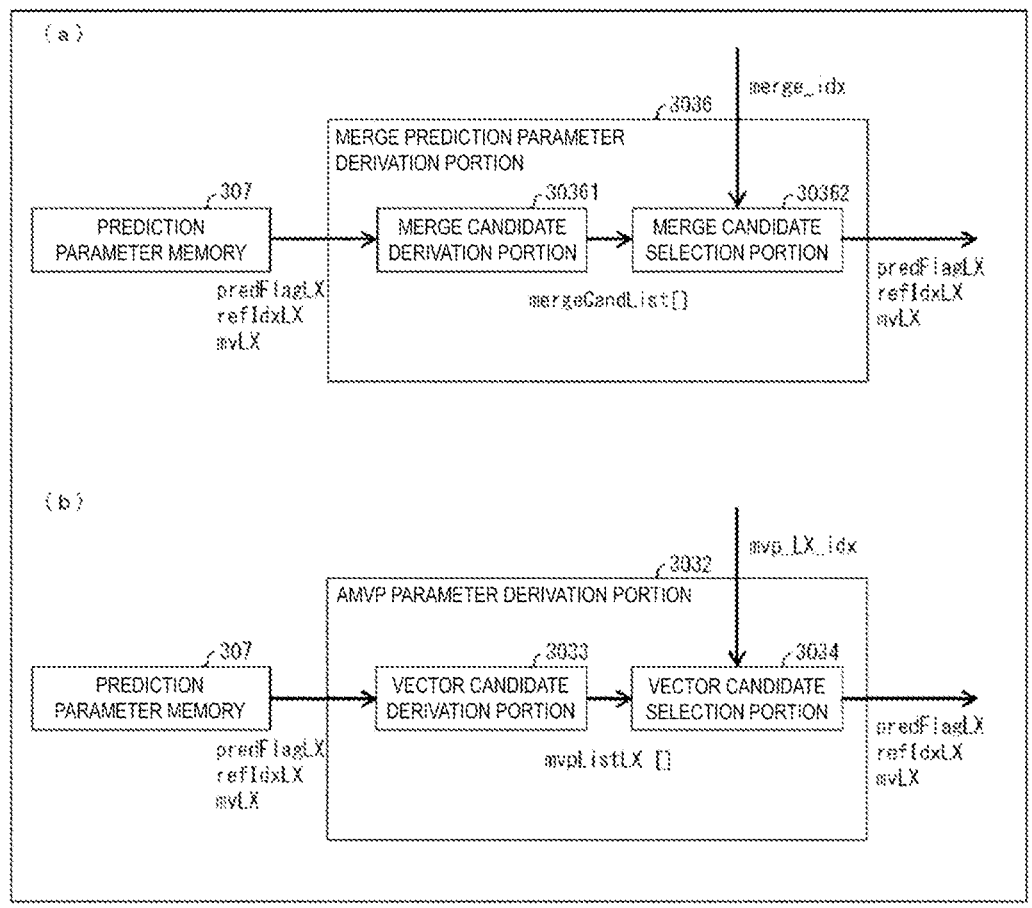
FIG. 9 is a schematic diagram showing components of a merge prediction parameter derivation portion and components of an AMVP prediction parameter derivation portion.

(a) of FIG. 9 is a schematic diagram showing components of the merge prediction parameter derivation portion 3036 included in the merge prediction portion 30374. The merge prediction parameter derivation portion 3036 includes a merge candidate derivation portion 30361 and a merge candidate selection portion 30362. It should be noted that the merge candidate is configured to include the prediction list use flag predFlagLX, the motion vector mvLX, and the reference picture index refIdxLX, and is stored in a merge candidate list. An index is assigned, according to a prescribed rule, to the merge candidate stored in the merge candidate list.

The merge candidate derivation portion 30361 directly uses the motion vector of a decoded adjacent block and the reference picture index refIdxLX to derive the merge candidate. In addition, the merge candidate derivation portion 30361 may use spatial merge candidate derivation processing, temporal merge candidate derivation processing, combined merge candidate derivation processing, and zero merge candidate derivation processing described below.

In the spatial merge candidate derivation processing, the merge candidate derivation portion 30361 reads, according to a prescribed rule, the prediction parameters stored in the prediction parameter memory 307, and configures the same to be merge candidates. In a reference picture designation method, the merge candidates are, for example, prediction parameters of each adjacent block within a predefined range from the object block (for example, all of or part of blocks adjacent to a left A1, a right B1, an upper right B0, a lower left A0, and an upper left B2 of the object block). These merge candidates are referred to as A1, B1, B0, A0, and B2.

Here, A1, B1, B0, A0, and B2 are motion information respectively derived from blocks including the following coordinates.

$A1: (xCb-1, yCb+cbHeight-1)$ $B1: (xCb+cbWidth-1, yCb-1)$ $B0: (xCb+cbWidth, yCb-1)$ $A0: (xCb-1, yCb+cbHeight)$ $B2: (xCb-1, yCb-1)$ In the temporal merge derivation processing, the merge candidate derivation portion 30361 reads, from the prediction parameter memory 307, prediction parameters of a lower right CBR of the object block or a block C in a reference image including center coordinates, configures the same to be merge candidates Col, and stores the same in a merge candidate list mergeCandList[ ].

A combined derivation portion derives a combined candidate avgK, and stores the same in the merge candidate list mergeCandList[ ].

The merge candidate derivation portion 30361 derives zero merge candidates Z0 ... ZM of which the reference picture index refIdxLX is 0 ... M and an X component and a Y component of the motion vector mvLX are both 0, and stores the same in the merge candidate list.

The merge candidate derivation portion 30361 or the combined derivation portion stores the merge candidates in the merge candidate list mergeCandList[ ] in an order of, for example, the spatial merge candidates (A1, B1, B0, A0, B2), the temporal merge candidates Col, the combined candidate AvgK, and the zero merge candidates ZeroCandK. It should be noted that unavailable reference blocks (blocks for intra-frame prediction, etc.) are not stored in the merge candidate list.

$i=0$ if (availableFlagA1)

mergeCandList[$i$++]=$A1$ if (availableFlagB1)

mergeCandList[$i$++]=$B1$ if (availableFlagB0)

mergeCandList[$i$++]=$B0$ if (availableFlagA0)

mergeCandList[$i$++]=$A0$ if (availableFlagB2)

mergeCandList[$i$++]=$B2$ if (availableFlagCol)

mergeCandList[$i$++]=Col if (availableFlagAvgK)

mergeCandList[$i$++]=avg$K$ if ($i$<MaxNumMergeCand)

mergeCandList[$i$++]=ZK

It should be noted that upper left coordinates of the object block are configured to be (xCb, yCb), the width of the object block is configured to be cbWidth, and the height of the object block is configured to be cbHeight.

The merge candidate selection portion 30362 selects, by means of the following equation, a merge candidate N indicated by the merge index merge_idx among the merge candidates included in the merge candidate list.

N=mergeCandList[merge_idx]

Here, N is a tag indicating the merge candidate, and takes A1, B1, B0, A0, B2, Col, AvgK, ZeroCandK, etc. Motion information of the merge candidate indicated by the tag N is denoted by (mvLXN[0], mvLXN[1]), predFlagLXN, and refIdxLXN.

The merge candidate selection portion 30362 selects motion information (mvLXN[0], mvLXN[1]), predFlagLXN, and refIdxLXN of the selected merge candidate as inter-frame prediction parameters of the object block. The merge candidate selection portion 30362 stores the selected inter-frame prediction parameters in the prediction parameter memory 307, and outputs the same to the prediction image generation portion 308.

(MMVD Prediction Portion 30373)

The MMVD prediction portion 30373 adds the difference vector mvdLX to the center vector mvdLX (motion vector serving as the merge candidate) derived by the merge candidate derivation portion 30361 to derive the motion vector.

The MMVD prediction portion 30376 uses syntax base_candidate_idx, direction_idx, and distance_idx from the merge candidate mergeCandList[ ] and for decoding the encoded data or encoding the encoded data to derive a motion vector mvLX[ ]. In addition, syntax distance_list_idx for selecting a distance list can be encoded or decoded.

The MMVD prediction portion 30376 can select a center vector mvLN[ ] by means of base_candidate_idx.

N=mergeCandList[base_candidate_idx]

The MMVD prediction portion 30376 derives a basic distance (mvdUnit[0], mvdUnit[1]) and a distance DistFromBaseMV.

dir_table_x[ ]={8,−8,0,0,6,−6,−6,6} dir_table_y[ ]={0,0,8,−8,6,6,−6,−6} mvdUnit[0]=dir_table_x[direction_idx]

mvdUnit[1]=dir_table_y[direction_idx]

DistFromBaseMV=DistanceTable[distance_idx]

The MMVD prediction portion 30376 derives a difference vector refineMv[ ].

firstMv[0]=(DistFromBaseMV<<shiftMMVD)*mvdUnit[0]

firstMv[1]=(DistFromBaseMV<<shiftMMVD)*mvdUnit[1]

Here, shiftMMVD is a value for adjusting the size of the difference vector to match accuracy MVPREC of the motion vector in a motion compensation portion 3091 (interpolation portion).

refineMvL0[0]=firstMv[0]

refineMvL0[1]=firstMv[1]

refineMvL1[0]=−firstMv[0]

refineMvL1[1]=−firstMv[1]

Finally, the MMVD prediction portion 30376 derives the motion vector of the MMVD merge candidate from the difference vector refineMvLX and the center vector mvLXN as described below.

mvL0[0]=mvL0N[0]+refineMvL0[0]

mvL0[1]=mvL0N[1]+refineMvL0[1]

mvL1[0]=mvL1N[0]+refineMvL1[0]

mvL1[1]=mvL1N[1]+refineMvL1[1]

(AMVP Prediction)

(b) of FIG. 9 is a schematic diagram showing components of the AMVP prediction parameter derivation portion 3032 according to this embodiment. The AMVP prediction parameter derivation portion 3032 includes a vector candidate derivation portion 3033 and a vector candidate selection portion 3034. The vector candidate derivation portion 3033 derives prediction vector candidates on the basis of the reference picture index refIdxLX and according to the motion vector mvLX of the decoded adjacent block stored in the prediction parameter memory 307, and stores the same in a prediction vector candidate list mvpListLX[ ].

The vector candidate selection portion 3034 selects a motion vector mvpListLX[mvp_LX_idx] indicated by a prediction vector index mvp_LX_idx among prediction vector candidates in the prediction vector candidate list mvpListLX[ ] as the prediction vector mvpLX. The vector candidate selection portion 3034 outputs the selected prediction vector mvpLX to the addition portion 3038.

The addition portion 3038 adds the prediction vector mvpLX inputted from the AMVP prediction parameter derivation portion 3032 to the decoded difference vector mvdLX so as to calculate the motion vector mvLX. The addition portion 3038 outputs the calculated motion vector mvLX to the prediction image generation portion 308 and the prediction parameter memory 307.

mvLX[0]=mvpLX[0]+mvdLX[0]

mvLX[1]=mvpLX[1]+mvdLX[1]

The motion vector accuracy mode amvr_mode is syntax for performing switching between accuracies of the motion vector derived in the AMVP mode; for example, when amvr_mode=0, 1, or 2, the accuracy is switched to 1/4 pixels, 1 pixel, and 4 pixels.

When the accuracy of the motion vector is configured to be 1/16, the MvShift (=1<<amvr_mode) derived from amvr_mode can be used to perform inverse quantization as described below, and the inverse quantization is used to change motion vector differences having an accuracy of 1/4 pixels, 1 pixel, and 4 pixels into motion vector differences having an accuracy of 1/16 pixel.

mvdLX[0]=mvdLX[0]<<(MvShift+2)

mvdLX[1]=mvdLX[1]<<(MvShift+2)

It should be noted that the parameter decoding portion 302 can further decode the following syntax to derive mvdLX[ ].

The following are decoded:
abs_mvd_greater0_flag
abs_mvd_minus2
mvd_sign_flag

Then, the parameter decoding portion 302 decodes a difference vector 1Mvd[ ] from the syntax by using the following equation.

1Mvd[compIdx]=abs_mvd_greater0_flag[compIdx]*
(abs_mvd_minus2[compIdx]+2)*(1−
2*mvd_sign_flag[compIdx])

In addition, in the case of a shifting MVD (MotionModelIdc[x][y]==0), the decoded difference vector 1Mvd[ ] is configured to be mvdLX, and in the case of a control point MVD (MotionModelIdc[x][y]!=0), the decoded difference vector 1Mvd[ ] is configured to be mvdCpLX.

if (MotionModelIdc[x][y]==0)

mvdLX[x0][y0][compIdx]=1Mvd[compIdx]

else mvdCpLX[x0][y0][compIdx]=1Mvd[compIdx]<<2

(DMVR)

Next, Decoder side Motion Vector Refinement (DMVR) processing performed by the DMVR portion 30375 is described. When the object CU instructs the merge flag merge_flag to use the merge prediction mode or instructs the skip flag skip_flag to use the skip mode, the DMVR portion 30375 uses the reference image to correct the motion vector mvLX of the object CU derived by the merge prediction portion 30374.

Specifically, when the prediction parameter derived by the merge prediction portion 30374 is bidirectional prediction, a prediction image derived from motion vectors corresponding to two reference pictures is used to correct the motion vector. The corrected motion vector mvLX is provided to the inter-frame prediction image generation portion 309.

(Triangle Prediction)

Next, the triangle prediction is described. In the triangle prediction, the object CU is split into two triangle prediction units by using a diagonal line or an opposite diagonal line as a boundary. A prediction image in each triangle prediction unit is derived by weighting each pixel of the prediction image of the object CU (a rectangular block including the triangle prediction unit) to the position of the pixel and performing mask processing. For example, a triangular image can be derived from a rectangular image by multiplying by a mask that configures pixels of a triangular region in a rectangular region to be 1 and configures pixels of a region outside the triangle to be 0. In addition, after an inter-frame prediction image is generated, adaptive weighting processing is applied to the two regions sandwiching the diagonal line, and a prediction image of the object CU (rectangular block) is derived by means of adaptive weighting processing employing two prediction images. This processing is referred to as triangle synthesis processing. Then, transform (inverse transform) and quantization (inverse quantization) processing is applied to the entire object CU. It should be noted that triangle prediction is used only in the merge prediction mode or the skip mode.

The triangle prediction portion 30377 derives prediction parameters corresponding to the two triangle regions for the triangle prediction, and provides the same to the inter-frame prediction image generation portion 309. In the triangle prediction, in order to simplify the processing, configuration not using bidirectional prediction may be made. In this case, an inter-frame prediction parameter for unidirectional prediction is derived in a triangle region. It should be noted that the derivation of the two prediction images and the synthesis employing the prediction image are performed in the motion compensation portion 3091 and the triangle synthesis portion 30952.

The loop filter 305 is a filter provided in an encoding loop, and is a filter for eliminating block distortion and ringing distortion to improve image quality. The loop filter 305 performs filtering such as de-blocking filtering, Sampling Adaptive Offset (SAO), and Adaptive Loop Filtering (ALF) on the decoded image of the CU generated by the addition portion 312.

The reference picture memory 306 stores the decoded image of the CU generated by the addition portion 312 in a predefined position for each object picture and each object CU.

The prediction parameter memory 307 stores the prediction parameters in a predefined position for the CTU or the CU of each decoded object. Specifically, the prediction parameter memory 307 stores the parameters decoded by the parameter decoding portion 302, the prediction mode predMode decoded by the entropy decoding portion 301, etc.

The prediction mode predMode, the prediction parameters, etc., are inputted into the prediction image generation portion 308. In addition, the prediction image generation portion 308 reads the reference picture from the reference picture memory 306. The prediction image generation portion 308 uses, in a prediction mode indicated by the prediction mode predMode, the prediction parameters and the read reference picture (reference picture block) to generate a prediction image of the block or the sub-block. Here, the reference picture block refers to a collection (generally a rectangle, and therefore it is referred to as a block) of pixels on the reference picture, and is a region referenced for prediction image generation.

(Inter-Frame Prediction Image Generation Portion 309)

When the prediction mode predMode indicates the inter-frame prediction mode, the inter-frame prediction image generation portion 309 uses the inter-frame prediction parameter inputted from the inter-frame prediction parameter decoding portion 303 and the read reference picture to generate the prediction image of the block or the sub-block by means of inter-frame prediction.

Figure 10:
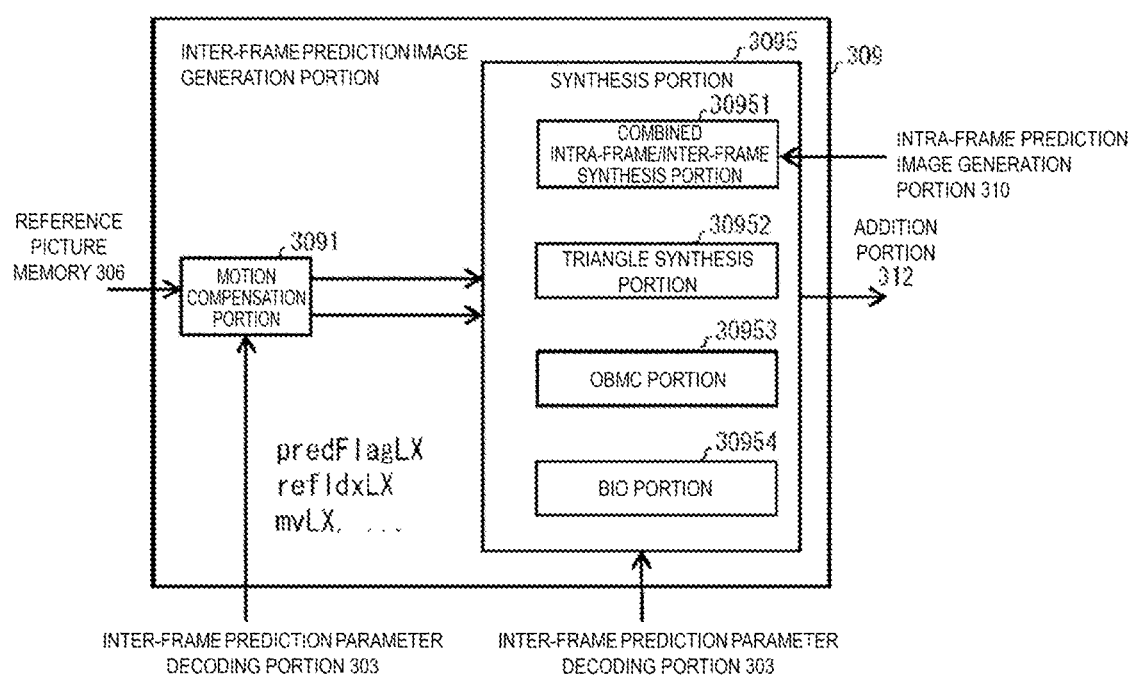
FIG. 10 is a schematic diagram showing components of an inter-frame prediction image generation portion.

FIG. 10 is a schematic diagram showing components of the inter-frame prediction image generation portion 309 included in the prediction image generation portion 308 according to this embodiment. The inter-frame prediction image generation portion 309 is configured to include a motion compensation portion (prediction image generation device) 3091 and a synthesis portion 3095.

(Motion Compensation)

On the basis of the inter-frame prediction parameters (prediction list use flag predFlagLX, reference picture index refIdxLX, and motion vector mvLX) inputted from the inter-frame prediction parameter decoding portion 303, the motion compensation portion 3091 (interpolation image generation portion 3091) generates an interpolation image (motion compensation image) by reading, from the reference picture memory 306, a block located in a position shifted by the motion vector mvLX from a position of the object block in a reference picture RefPicLX indicated by the reference picture index refIdxLX. Here, when the accuracy of the motion vector mvLX is not integer accuracy, the motion compensation image is generated by performing filtering referred to as motion compensation filtering, which is used to generate pixels in decimal positions.

The motion compensation portion 3091 firstly derives, by means of the following equations, an integer position (xInt, yInt) and a phase (xFrac, yFrac) corresponding to the coordinates (x, y) in the prediction block.

xInt=xPb+(mvLX[0]>>(log 2(MVPREC)))+x xFrac=mvLX[0]&(MVPREC−1)

yInt=yPb+(mvLX[1]>>(log 2(MVPREC)))+y yFrac=mvLX[1]&(MVPREC−1)

Here, (xPb, yPb) are upper left coordinates of a block having a size of bW×bH; x=0 . . . bW−1, y=0 . . . bH−1; MVPREC denotes the accuracy of the motion vector mvLX (1/MVPREC pixels accuracy). For example, MVPREC=16.

The motion compensation portion 3091 uses an interpolation filter to perform horizontal interpolation processing on a reference picture refImg so as to derive a temporary image temp[ ][ ]. In the following equation, Σ is a sum regarding k of k=0 . . . NTAP−1, shift1 is a normalization parameter for adjusting a range of values, and offset1=1<<(shift1−1).

temp[x][y]=(ΣmcFilter[xFrac][k]*refImg[xInt+k−NTAP/2+1][yInt]+offset1)>> shift1. Subsequently, the motion compensation portion 3091 derives an interpolation image Pred[ ][ ] by performing vertical interpolation processing on the temporal image temp[ ][ ]. In the following equation, Σ is a sum regarding k of k=0 . . . NTAP−1, shift2 is a normalization parameter for adjusting a range of values, and offset2=1<<(shift2−1).

Pred[x][y]=(ΣmcFilter[yFrac][k]*temp[x][y+k−NTAP/2+1]+offset2)>>shift2

The above interpolation image generation processing can be denoted by interpolations (refImg, xPb, yPb, bW, bH, mvLX).
(Synthesis Portion)

The synthesis portion 3095 generates a prediction image by referring to the interpolation image provided by the motion compensation portion 3091, the inter-frame prediction parameter provided by the inter-frame prediction parameter decoding portion 303, and the intra-frame image provided by the intra-frame prediction image generation portion 310, and provides the generated prediction image to the addition portion 312.

The synthesis portion 3095 includes a combined intra-frame/inter-frame synthesis portion 30951, a triangle synthesis portion 30952, an OBMC portion 30953, and a BIO portion 30954.
(Combined Intra-Frame/Inter-Frame Synthesis Processing)

The combined intra-frame/inter-frame synthesis portion 30951 uses a unidirectional prediction image in AMVP, a prediction image based on the skip mode and the merge prediction mode, and the intra-frame prediction image to generate a prediction image.
(Triangle Synthesis Processing)

The triangle synthesis portion 30952 generates a prediction image employing the above triangle prediction.
(OBMC Processing)

The OBMC portion 30953 uses Overlapped Block Motion Compensation (OBMC) processing to generate a prediction image. The OBMC processing includes the following processing.

An interpolation image (PU interpolation image) generated by using the inter-frame prediction parameter associated with the object sub-block and an interpolation image (OBMC interpolation image) generated by using the motion parameter of the adjacent sub-block of the object sub-block are used to generate an interpolation image (motion compensation image) of the object sub-block.

A prediction image is generated by performing weighted average on the OBMC interpolation image and the PU interpolation image.
(BIO Processing)

The BIO portion 30954 generates a prediction image by performing Bi-directional Optical flow (BIO, or bidirectional prediction gradient change) processing. The BIO portion 30954 is described in detail below.

(Weighted Prediction)

In the weighted prediction, a prediction image of the block is generated by multiplying a motion compensation image PredLX by a weighting coefficient. When one of the prediction list use flags (predFlagL0 or predFlagL1) is 1 (unidirectional prediction) and weighted prediction is not used, processing for matching the motion compensation image PredLX (LX is L0 or L1) with a pixel bit number bitDepth is performed by means of the following equation.

Pred[x][y]=Clip3(0,(1<<bitDepth)−1,(PredLX[x][y]+offset1)>>shift1)

Here, shift1=14−bitDepth, offset1=1<<(shift1−1).

In addition, when both of the reference list use flags (predFlagL0 and predFlagL1) are 1 (bidirectional prediction BiPred) and weighted prediction is not used, processing for averaging the motion compensation images PredL0 and PredL1 and matching an average number thereof with the pixel bit number is performed by means of the following equation.

Pred[x][y]=Clip3(0,(1<<bitDepth)−1,(PredL0[x][y]+PredL1[x][y]+offset2)>>shift2)

Here, shift2=15−bitDepth, offset2=1<<(shift2−1).

In addition, when unidirectional prediction is performed and weighted prediction is performed, the synthesis portion 3095 derives a weighted prediction coefficient w0 and an offset value o0 from the encoded data, and performs processing denoted by the following equation.

Pred[x][y]=Clip3(0,(1<<bitDepth)−1,((PredLX[x][y]*w0+2^(log 2WD−1))>>log 2WD)+o0)

Here, log 2WD is a variable denoting a defined shift amount.

In addition, when bidirectional prediction BiPred is performed and weighted prediction is performed, the synthesis portion 3095 derives weighted prediction coefficients w0, w1, o0, and o1 from the encoded data, and performs processing denoted by the following equation.

Pred[x][y]=Clip3(0,(1<<bitDepth)−1,(PredL0[x][y]*w0+PredL1[x][y]*w1+((o0+o1+1)<<log 2WD))>>(log 2WD+1))

Then, the generated prediction image of the block is outputted to the addition portion 312.

The inverse quantization/inverse transform portion 311 inversely quantizes the quantization and transform coefficient inputted from the entropy decoding portion 301 to acquire a transform coefficient. The quantization and transform coefficient is a coefficient acquired by performing frequency transform and quantization such as Discrete Cosine Transform (DCT), Discrete Sine Transform (DST), etc., on the prediction error in the encoding processing. The inverse quantization/inverse transform portion 311 performs inverse frequency transform such as inverse DCT, inverse DST, etc., on the acquired transform coefficient to calculate the prediction error. The inverse quantization/inverse transform portion 311 outputs the prediction error to the addition portion 312.

The addition portion 312 adds the prediction image of the block inputted from the prediction image generation portion 308 to the prediction error inputted from the inverse quantization/inverse transform portion 311 for each pixel to generate a decoded image of the block. The addition portion 312 stores the decoded image of the block in the reference picture memory 306, and outputs the same to the loop filter 305.

(BIO Prediction)

Next, prediction (BIO prediction) using the BIO processing performed by the BIO portion 30954 is described in detail. The BIO portion 30954 generates a prediction image by referring to two prediction images (a first prediction image and a second prediction image) and a gradient correction item in the bidirectional prediction mode.

Figure 11:
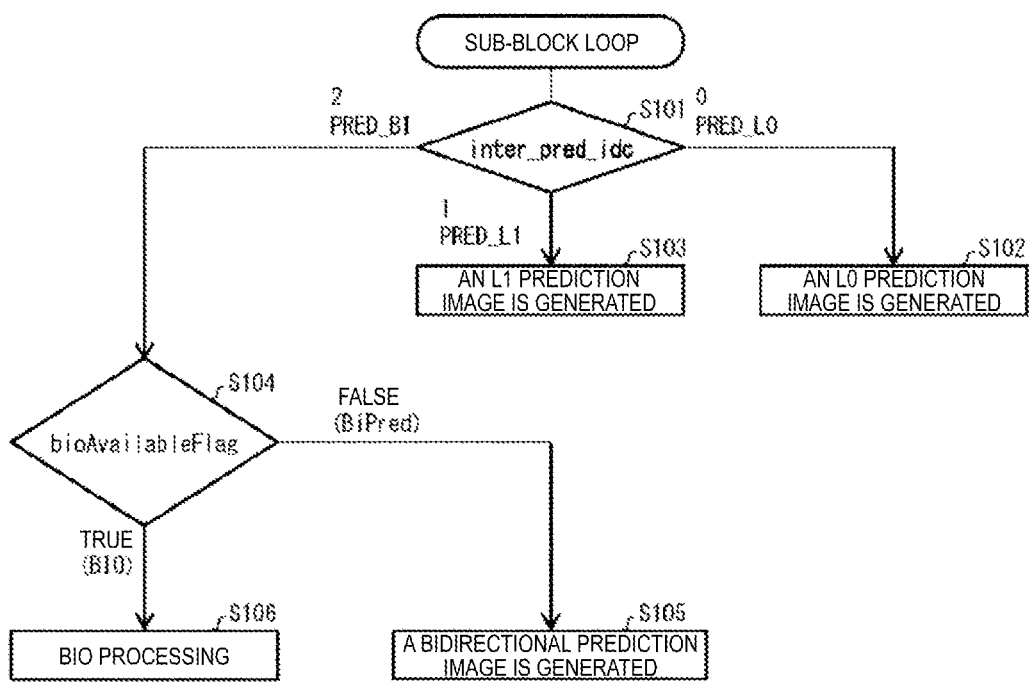
FIG. 11 is a diagram showing an example of a flowchart illustrating a procedure of derivation of a prediction image performed by a motion compensation portion having a motion compensation function and using BIO prediction according to this embodiment.

FIG. 11 is a flowchart illustrating the procedure of derivation of the prediction image.

When the inter-frame prediction parameter decoding portion 303 determines unidirectional prediction of L0 (inter_pred_idc is 0 in S101), the motion compensation portion 3091 generates an L0 prediction image PredL0[x][y] (S102). When the inter-frame prediction parameter decoding portion 303 determines unidirectional prediction of L1 (inter_pred_idc is 1 in S101), the motion compensation portion 3091 generates an L1 prediction image PredL1[x][y] (S103). On the other hand, when the inter-frame prediction parameter decoding portion 303 determines a bidirectional prediction mode (inter_pred_idc is 2 in S101), S104 is performed. In S104, the synthesis portion 3095 refers to bioAvailableFlag indicating whether to perform BIO processing to determine whether to perform BIO processing. When bioAvailableFlag indicates TRUE, the BIO portion 30954 performs BIO processing to generate a bidirectional prediction image (S106). When bioAvailableFlag indicates FALSE, the synthesis portion 3095 generates a prediction image by means of generation of conventional two-party prediction images (S105).

The inter-frame prediction parameter decoding portion 303 may determine that bioAvailableFlag indicates TRUE when the L0 reference image refImgL0 and the L1 reference image refImgL1 are different reference images and are in an opposite direction with respect to the object picture. Specifically, when the object image is configured to be currPic, and the condition of DiffPicOrderCnt(currPic, refImgL0)*DiffPicOrderCnt(currPic, refImgL1)<0 is met, bioAvailableFlag indicates TRUE. Here, DiffPicOrderCnt( ) is a function for deriving a difference of Picture Order Count (POC) of two images as follows.

$$DiffPicOrderCnt(picA, picB) = PicOrderCnt(picA) - PicOrderCnt(picB)$$

A condition that the motion vector of the object block is not a motion vector in units of sub-blocks can be added as a condition that bioAvailableFlag indicates TRUE.

In addition, a condition that the motion vector of the object picture is not a motion vector in units of sub-blocks can also be added as a condition that bioAvailableFlag indicates TRUE.

In addition, a condition that the sum of an absolute difference between the L0 prediction image and the L1 prediction image of the two prediction blocks is greater than a specified value can also be added as a condition that bioAvailableFlag indicates TRUE.

In addition, a condition that the prediction image generation mode is a prediction image generation mode in units of blocks can also be added as a condition that bioAvailableFlag indicates TRUE.

Figure 12:
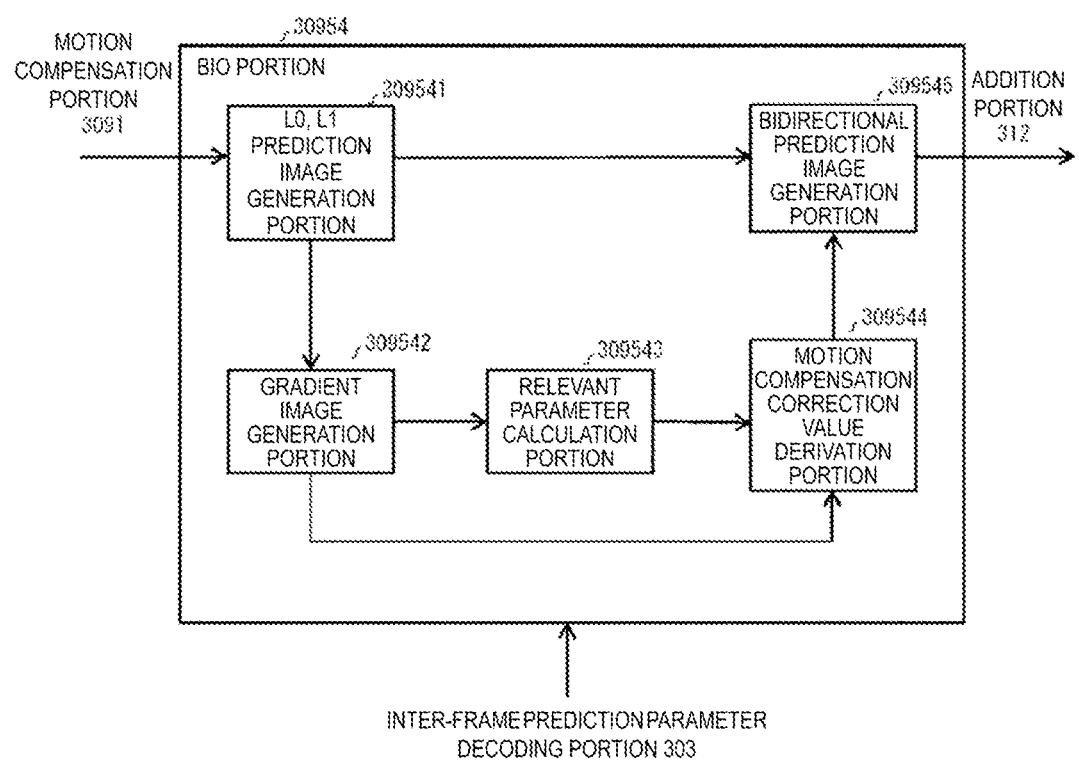
FIG. 12 is a schematic diagram showing components of a BIO portion according to this embodiment.

Specific processing performed by the BIO portion 30954 is illustrated in FIG. 12. The BIO processing portion 30954 includes: L0 and L1 prediction image generation portion 309541, a gradient image generation portion 309542, a relevant parameter calculation portion 309543, a motion compensation correction value derivation portion 309544, and a bidirectional prediction image generation portion 309545. The BIO portion 30954 generates a prediction image from the interpolation image received from the motion compensation portion 3091 and the inter-frame prediction parameter received from the inter-frame prediction parameter decoding portion 303, and outputs the generated prediction image to the addition portion 312. It should be noted that the processing of deriving a motion compensation correction value modBIO (motion compensation correction image) from a gradient image, performing correction, and deriving prediction images of PredL0 and PredL1 is referred to as bidirectional gradient change processing.

Figure 13:
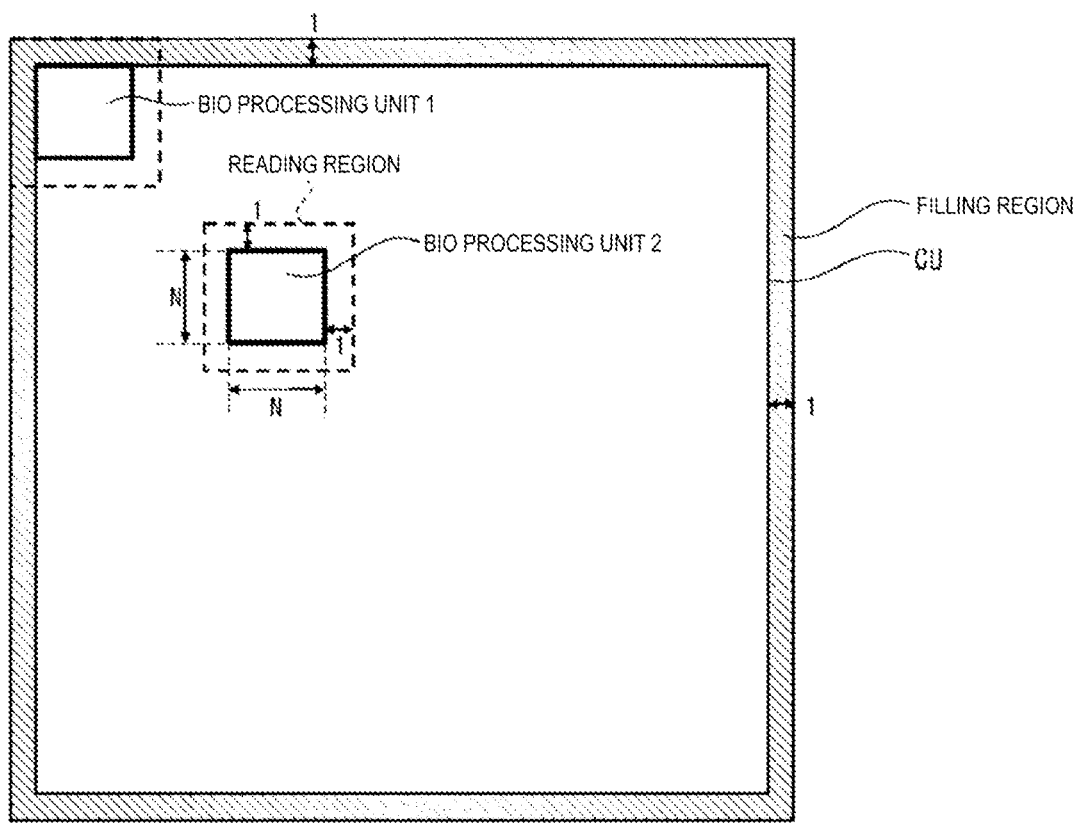
FIG. 13 is a diagram showing an example of a region where a BIO portion performs BIO filling according to this embodiment.

Firstly, L0 and L1 prediction images for BIO processing are generated in the L0 and L1 prediction image generation portion 309541. In the BIO portion 30954, BIO processing is performed on the basis of the L0 and L1 prediction images for each CU unit or each sub-CU unit shown in FIG. 13; however, interpolation image information of two surrounding pixels of an object CU or an object sub-CU is further needed to acquire a gradient. An image having a short tap length such as a bilinear filter instead of a conventional interpolation filter is used to generate interpolation image information of this portion, and the interpolation image information is used for generation of a gradient image described below. In other cases, this portion and an outer side of the picture copy and use surrounding pixels in the same manner as a filling region. In addition, the BIO processing is in units of N×N pixels below the CU unit or the sub-CU unit, and the processing uses (N+2)×(N+2) pixels including one surrounding pixel.

The gradient image is generated in the gradient image generation portion 309542. During the gradient change (optical flow), it is assumed that the pixel value of each point does not change and only the position thereof changes. This can be denoted by a change in a pixel value I in the horizontal direction (horizontal gradient value lx) and a position change Vx thereof, a change in the pixel value I in the vertical direction (vertical gradient value ly) and a position change Vy thereof, and a temporal change lt of the pixel value I in the following equation.

$$lx*Vx + ly*Vy + lt = 0$$

The position change (Vx, Vy) is referred to as a correction weight vector (u, v).

Specifically, the gradient image generation portion 309542 derives gradient images lx0, ly0, lx1, and ly1 by means of the following equation. lx0 and lx1 denote the gradient in the horizontal direction, and ly0 and ly1 denote the gradient in the vertical direction.

$$lx0[x][y] = (PredL0[x+1][y] - PredL0[x-1][y]) >> 4$$

$$ly0[x][y] = (PredL0[x][y+1] - PredL0[x][y-1]) >> 4$$

$$lx1[x][y] = (PredL1[x+1][y] - PredL1[x-1][y]) >> 4$$

$$ly1[x][y] = (PredL1[x][y+1] - PredL1[x][y-1]) >> 4$$

Then, the relevant parameter calculation portion 309543 uses the one surrounding pixel of each block of N×N pixels in each CU to derive gradient product sums s1, s2, s3, s5, and s6 of (N+2)×(N+2) pixels.

$$s1 = sum(phiX[x][y]*phiX[x][y])$$

$$s2 = sum(phiX[x][y]*phiY[x][y])$$

$$s3 = sum(-theta[x][y]*phiX[x][y])$$

$$s5 = sum(phiY[x][y]*phiY[x][y])$$

$$s6 = sum(-theta[x][y]*phiY[x][y])$$

Here, sum(a) denotes the sum of a in the coordinates (x, y) in the block of (N+2)×(N+2) pixels. In addition, $$phiX[x][y]=(lx1[x][y]+lx0[x][y])>>3$$

$$phiY[x][y]=(ly1[x][y]+ly0[x][y])>>3$$

$$theta[x][y]=-(PredL1[x][y]>>6)+(PredL0[x][y]>>6)$$

Then, the motion compensation correction value derivation portion 30954 uses the derived gradient product sums s1, s2, s3, s5, and s6 to derive a correction weight vector (u, v) in units of N×N pixels.

$$u=(s3<<3)>>\log 2(s1)$$

$$v=((s6<<3)-((((u*s2m)<<12)+u*s2s)>>1))>>\log 2(s5)$$

Here, s2 m=s2>>12, s2s=s2&((1<<12)-1).

It should be noted that clipping can be further used to limit the range of u and v as shown below.

$$u=s1>0?Clip3(-th,th,-(s3<<3)>>floor(\log 2(s1))):0$$

$$v=s5>0?Clip3(-th,th,((s6<<3)-((((u*s2m)<<12)+u*s2s)>>1))>>floor(\log 2(s5))):0. Here, th=1<<(13-bitDepth).$$

The motion compensation correction value derivation portion 309544 uses the correction weight vector (u, v) in units of N×N pixels and the gradient images lx0, ly0, lx1, and ly1 to derive modBIO[x][y] of the motion compensation correction value of N×N pixels.

$$modBIO[x][y]=((lx1[x][y]-lx0[x][y])*u+(ly1[x][y]-ly0[x][y])*v+1)>>1$$ (equation A3) or a rounding function can be used to derive modBIO as shown below.

$$modBIO[x][y]=Round(((lx1[x][y]-lx0[x][y])*u)>>1)+Round(((ly1[x][y]-ly0[x][y])*v)>>1)$$

The bidirectional prediction image generation portion 309545 uses the above parameters to derive the pixel value Pred of the prediction image of N×N pixels by means of the following equation.

In this case, the bidirectional prediction image generation portion 309545 uses the above parameters to derive the pixel value Pred of the prediction image of N×N pixels by means of the following equation.

$$Pred[x][y]=Clip3(0,(1<<bitDepth)-1,(PredL0[x][y]+PredL1[x][y]+modBIO[x][y]+offset2)>>shift2)$$

Here, shift2=Max(3, 15−bitDepth), offset2=1<<(shift2−1).

Next, another embodiment of prediction (BIO prediction) using the BIO processing performed by the BIO portion 30954 is described. In the above embodiment, operation is performed correctly when the pixel bit length bitDepth is 10 bits; however, in other cases, calculation accuracy not for an encoding pixel bit length exists, resulting in reduced encoding efficiency. Therefore, as shown below, an internal bit length InternalBitDepth independent of the pixel bit length bitDepth is defined and used as the calculation accuracy in the BIO portion, and is fixed; therefore, regardless of bitDepth, the operation is in the range of 32 bits. Here, InternalBitDepth is configured to be a value equal to or greater than 8 and equal to or less than a maximum pixel bit length allowed by the decoding device.

Specifically, the gradient image generation portion 309542 performs derivation of the gradient images lx0, ly0, lx1, and ly1 as follows.

$$lx0[x][y]=(PredL0[x+1][y]-PredL0[x-1][y])>>shift0$$

$$ly0[x][y]=(PredL0[x][y+1]-PredL0[x][y-1])>>shift0$$

$$lx1[x][y]=(PredL1[x+1][y]-PredL1[x-1][y])>>shift0$$

$$ly1[x][y]=(PredL1[x][y+1]-PredL1[x][y-1])>>shift0$$

Here, shift0=Max(2, 14−InternalBitDepth).

When an interpolation filter the same as HEVC is used, if bitDepth is in the range of 8-12 bits, then the operation accuracy of the values of PredL0 and PredL1 is 14 bits, and is (InternalBitDepth+2) bits when bitDepth is greater than 12. In this embodiment, a right shift serves as shift1 of the value corresponding to InternalBitDepth, and the operation accuracy of the gradient images lx0, ly0, lx1, and ly1 is (InternalBitDepth+1) bits.

Then, the relevant parameter calculation portion 309543 derives the gradient product sums s1, s2, s3, s5, and s6 for each block of N×N pixels in the CU. Here, the one surrounding pixel of the block is further used to calculate s1, s2, s3, s5, and s6 according to the sum of pixels in the block of (N+2)*(N+2) pixels.

$$s1=sum(phiX[x][y]*phiX[x][y])$$

$$s2=sum(phiX[x][y]*phiY[x][y])$$

$$s3=sum(-theta[x][y]*phiX[x][y])$$

$$s5=sum(phiY[x][y]*phiY[x][y])$$

$$s6=sum(-theta[x][y]*phiY[x][y])$$

Here, sum(a) denotes the sum of a in the coordinates (x, y) in the block of (N+2)×(N+2) pixels. In addition, $$theta[x][y]=-(PredL1[x][y]>>shift4)+(PredL0[x][y]>>shift4)$$

$$phiX[x][y]=(lx1[x][y]+lx0[x][y])>>shift5$$

$$phiY[x][y]=(ly1[x][y]+ly0[x][y])>>shift5$$

Here, shift4=Min(8, InternalBitDepth−4) shift5=Min(5, InternalBitDepth−7).

In this case, if InternalBitDepth is equal to or greater than 8 and equal to or less than 12, then the operation accuracy of the value of theta is (19−InternalBitDepth) bits. In addition, if bitDepth of the image is in the range of 8-12 bits, then the operation accuracy of phiX and phiY is 9 bits. Therefore, when N=4, if bitDepth is in the range of 8-12 bits, then the total operation accuracy of s1, s2, and s5 of a block of 6×6 pixels is about 24 bits; even if the minimum value and the maximum value of PredL0 and PredL1 are in the range of 16 bits, the operation is also in the range of 32 bits. In addition, when N=4, the total operation accuracy of s3 and s6 of the block of 6×6 pixels is about (34−InternalBitDepth) bits. If the minimum value and the maximum value of PredL0 and PredL1 are in the range of 16 bits, then the above is implemented by means of 32-bit integer operations.

More specifically, when the case of InternalBitDepth=10 is considered, a method in which shift0=4, shift4=6, and shift5=3 includes the described embodiment.

In another configuration made to the relevant parameter calculation portion 309543, the gradient product sums s1, s2, s3, s5, and s6 may not be acquired by means of a block of (N+2)×(N+2) pixels but by means of a block of N×N pixels. When N=4, the block is a block of 4×4=16 pixels; therefore, compared with a total of 6×6=36 pixels, operation bits required by sum calculation are reduced by (Ceil(log 2(36))−Ceil(log 2(16))=2 bits; therefore, shift4=Min(7, InternalBitDepth−5) shift5=Min(4, InternalBitDepth−8)

Figure 14:
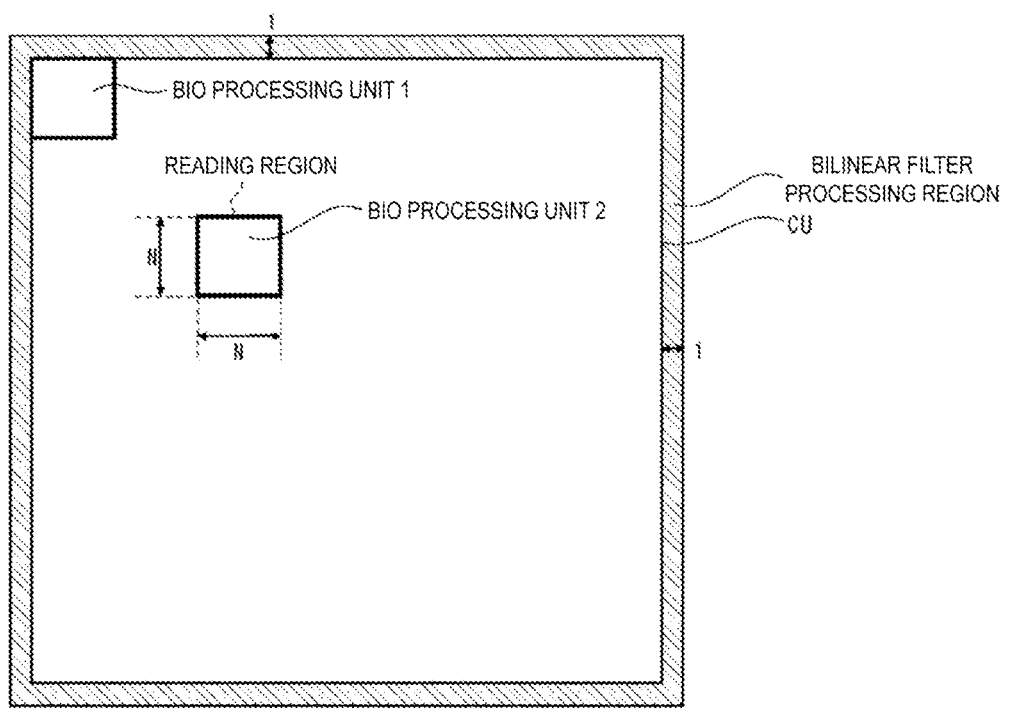
FIG. 14 is a diagram showing an example of a unit for performing BIO processing and a reading region of a BIO portion of this embodiment.

Even if values that are 1 bit less than the above are used, the above can also be implemented by means of 32-bit integer operations. In addition, the amount of operation of the gradient product sums can also be reduced. As shown in FIG. 14, the unit of BIO processing is the same as the reading region; therefore, unlike the case in FIG. 13, it is not needed to use a filling region of one surrounding pixel of the object CU or the object sub-CU.

It should be noted that regarding the bilinear filter processing region of FIG. 14, it is also possible to perform bilinear filter processing by performing a so-called filling processing in which one surrounding pixel of an inner side of the CU or the sub-CU is copied to one pixel of an outer side.

Then, the motion compensation correction value derivation portion 309544 uses the derived gradient product sums s1, s2, s3, s5, and s6 to derive a correction weight vector (u, v) in units of N×N pixels.

$$u=(s3<<3)>>\log 2(s1)$$

$$v=((s6<<3)-((((u*s2m)<<12)+u*s2s)>>1))>>\log 2(s5)$$

Here, s2 m=s2>>12, s2s=s2&((1<<12)−1).

It should be noted that clipping can be further used to limit the range of u and v as shown below.

$$u=s1>0?\text{Clip3}(-th,th,-(s3<<3)>>\text{floor}(\log 2(s1))):0$$

$$v=s5>0?\text{Clip3}(-th,th,((s6<<3)-((((u*s2m)<<12)+u*s2s)>>1))>>\text{floor}(\log 2(s5))):0,\text{Here},$$

th=Max(2, 1<<(13−InternalBitDepth)). th is a value independent of bitDepth; therefore, unlike the described embodiment, the correction weight vector (u, v) in units of pixels is clipped according to the value associated with InternalBitDepth. For example, when InternalBitDepth=10, th=1<<(13−10)=8; therefore, the clipping shown below is performed regardless of the pixel bit length bitDepth.

$$u=s1>0?\text{Clip3}(-8,8,-(s3<<3)>>\text{floor}(\log 2(s1))):0$$

$$v=s5>0?\text{Clip3}(-8,8,((s6<<3)-((((u*s2m)<<12)+u*s2s)>>1))>>\text{floor}(\log 2(s5))):0$$

In this case, the correction weight vector (u, v) in units of pixels is also related to the accuracy of the motion vector and the value of the quantization width; therefore, a threshold th for limiting the correction weight vector (u, v) can be expressed by a function of a quantization width Qp as shown below.

$$th0=\text{Max}(1,1<<(12-\text{InternalBitDepth}))$$

$$th=th0+\text{floor}((Qp-32)/6).$$

The motion compensation correction value derivation portion 309544 uses the correction weight vector (u, v) in units of N×N pixels and the gradient images lx0, ly0, lx1, and ly1 to derive modBIO of the motion compensation correction value of N×N pixels.

$$\text{modBIO}[x][y]=((lx1[x][y]-lx0[x][y])*u+(ly1[x][y]-ly0[x][y])*v)>>1$$

The bidirectional prediction image generation portion 309545 uses the above parameters to derive the pixel value Pred of the prediction image in units of N×N pixels by means of the following equation.

$$\text{Pred}[x][y]=\text{Clip3}(0,(1<<\text{bitDepth})-1,(\text{Pred}L0[x][y]+\text{Pred}L1[x][y]+\text{modBIO}[x][y]+\text{offset2})>>\text{shift2})$$

Here, shift2=Max(3, 15−bitDepth), offset2=1<<(shift2−1).

(Components of the Moving Image Encoding Device)

Figure 15:
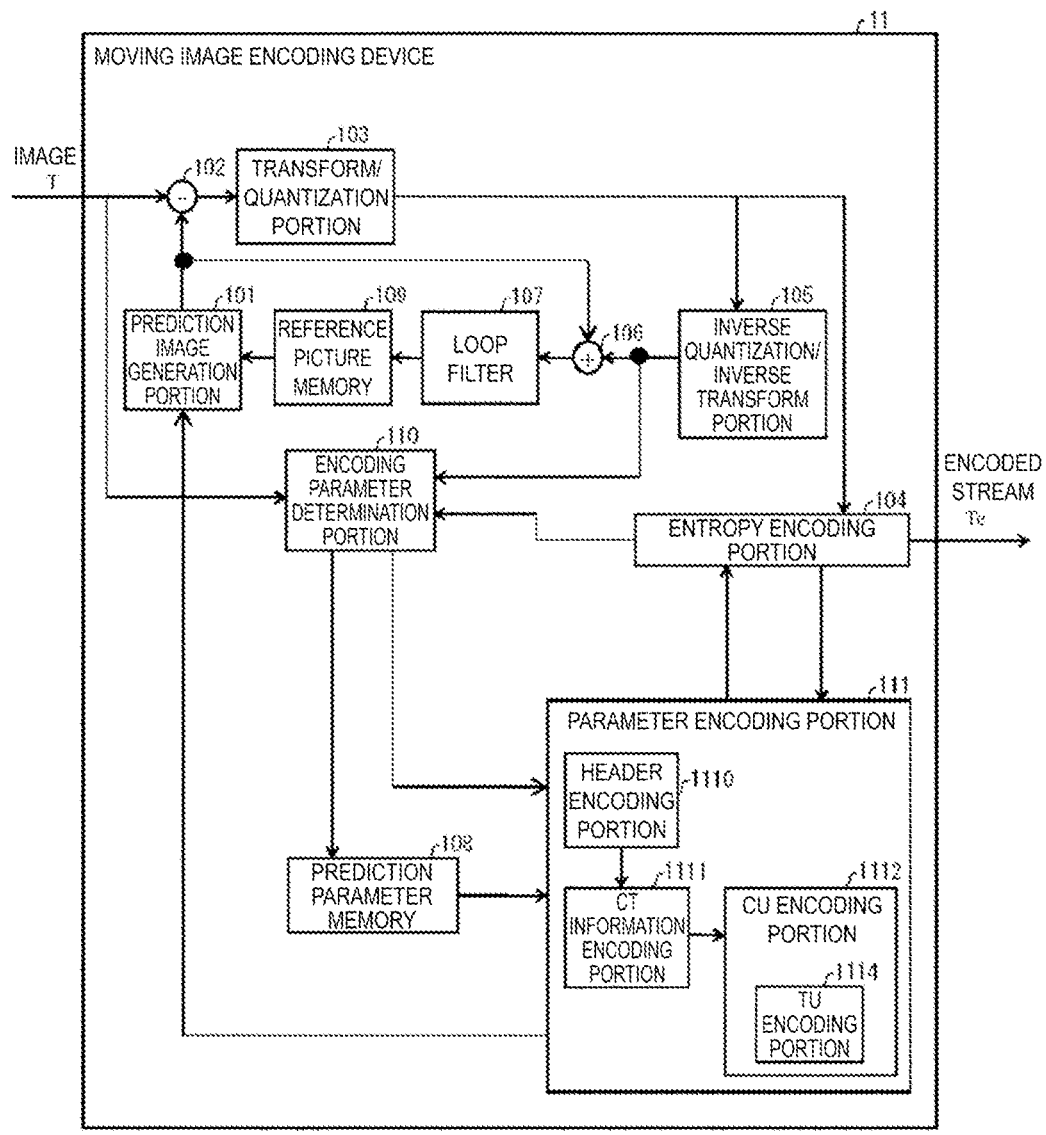
FIG. 15 is a block diagram showing components of a moving image encoding device.

Next, components of the moving image encoding device 11 according to this embodiment are described. FIG. 15 is a block diagram showing components of the moving image encoding device 11 according to this embodiment. The moving image encoding device 11 is configured to include: a prediction image generation portion 101, a subtraction portion 102, a transform/quantization portion 103, an inverse quantization/inverse transform portion 105, an addition portion 106, a loop filter 107, a prediction parameter memory (prediction parameter storage portion, frame memory) 108, a reference picture memory (reference image storage portion, frame memory) 109, an encoding parameter determination portion 110, a parameter encoding portion 111, and an entropy encoding portion 104.

The prediction image generation portion 101 generates a prediction image according to regions formed by splitting each picture of each image T, namely, according to the CU. The prediction image generation portion 101 performs the same action as the prediction image generation portion 308 described above, and the description therefor is omitted here.

The subtraction portion 102 subtracts a pixel value of the prediction image of the block inputted from the prediction image generation portion 101 from a pixel value of the image T to generate a prediction error. The subtraction portion 102 outputs the prediction error to the transform/quantization portion 103.

The transform/quantization portion 103 calculates a transform coefficient by performing frequency transform on the prediction error inputted from the subtraction portion 102, and derives a quantization and transform coefficient by means of quantization. The transform/quantization portion 103 outputs the quantization and transform coefficient to the entropy encoding portion 104 and the inverse quantization/inverse transform portion 105.

The inverse quantization/inverse transform portion 105 is the same as the inverse quantization/inverse transform portion 311 (FIG. 7) in the moving image decoding device 31, and therefore the description therefor is omitted here. The calculated prediction error is inputted to the addition portion 106.

In the entropy encoding portion 104, the quantization and transform coefficient is inputted from the transform/quantization portion 103, and encoding parameters are inputted from the parameter encoding portion 111. The encoding parameters include, for example, codes such as the reference picture index refIdxLX, the prediction vector index mvp_LX_idx, the difference vector mvdLX, the motion vector accuracy mode amvr_mode, the prediction mode predMode, and the merge index merge_idx.

The entropy encoding portion 104 performs entropy encoding on splitting information, the prediction parameters, the quantization and transform coefficient, etc., to generate an encoded stream Te, and outputs the same.

The parameter encoding portion 111 includes a header encoding portion 1110, a CT information encoding portion 1111, a CU encoding portion 1112 (prediction mode encoding portion), an inter-frame prediction parameter encoding portion 112, and an intra-frame prediction parameter encoding portion 113 not shown in the figure. The CU encoding portion 1112 further includes a TU encoding portion 1114.

Schematic operation of each module is described below. The parameter encoding portion 111 performs encoding processing on parameters such as header information, the splitting information, prediction information, the quantization and transform coefficient, etc.

The CT information encoding portion 1111 encodes QT splitting information, MT (BT, TT) splitting information, etc., according to the encoded data.

The CU encoding portion 1112 encodes the CU information, the prediction information, a TU split flag split_transform_flag, CU residual flags cbf_cb, cbf_cr, cbf_luma, etc.

When the TU includes the prediction error, the TU encoding portion 1114 encodes QP update information (quantization correction value) and a quantization prediction error (residual_coding).

The CT information encoding portion 1111 and the CU encoding portion 1112 provide syntax elements such as the inter-frame prediction parameters (the prediction mode predMode, the merge flag merge_flag, the merge index merge_idx, the inter-frame prediction identifier inter_pred_idc, the reference picture index refIdxLX, the prediction vector index mvp_LX_idx, and the difference vector mvdLX), the intra-frame prediction parameters, the quantization and transform coefficient, etc., to the entropy encoding portion 104.

(Components of the Inter-Frame Prediction Parameter Encoding Portion)

The parameter encoding portion 112 derives the inter-frame prediction parameters on the basis of the prediction parameters inputted from the encoding parameter determination portion 110. The parameter encoding portion 112 includes the same components as the components for the inter-frame prediction parameter decoding portion 303 to derive the inter-frame prediction parameters.

Figure 16:
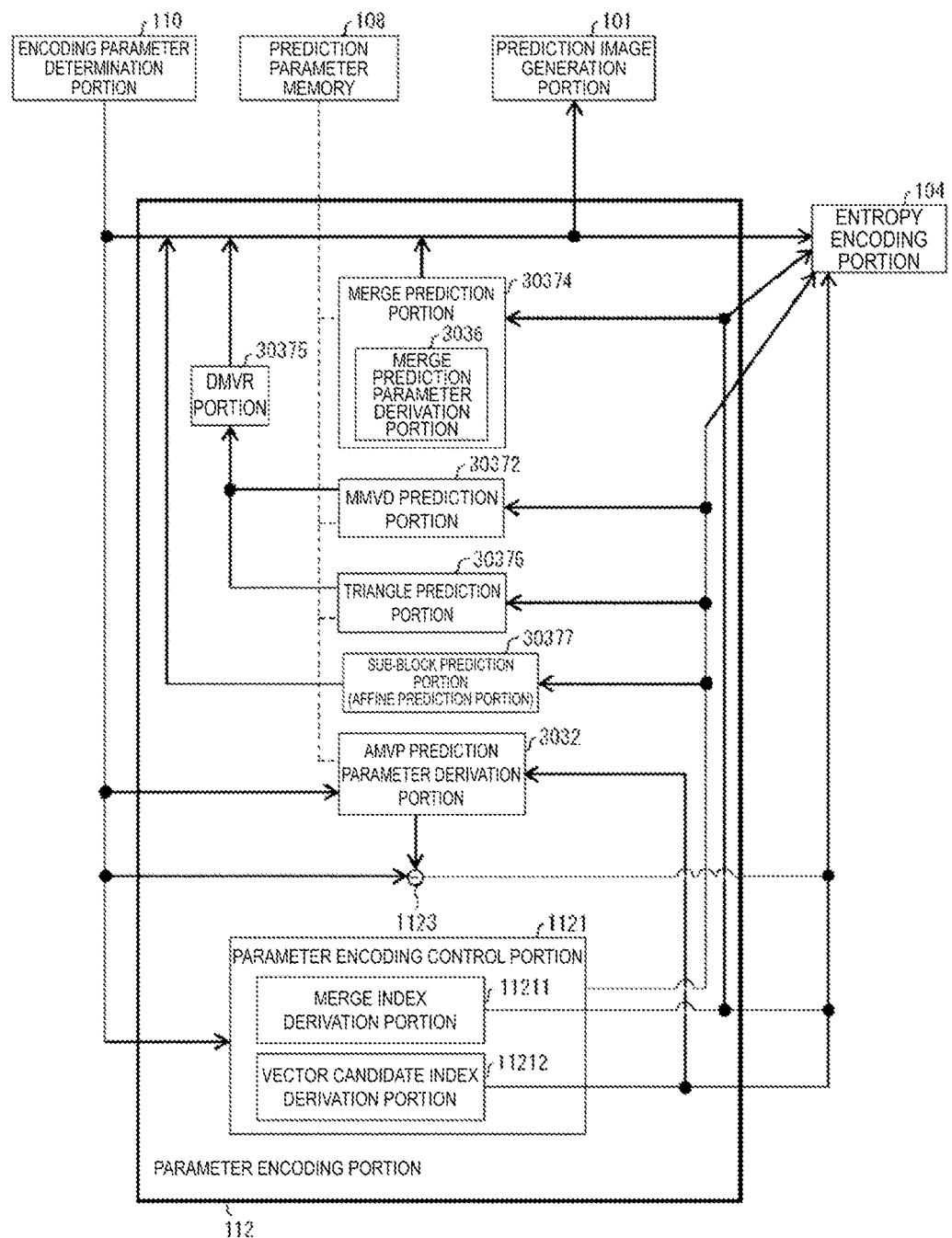
FIG. 16 is a schematic diagram showing components of an inter-frame prediction parameter encoding portion.

The components of the prediction parameter encoding portion 112 are described. As shown in FIG. 16, the components include: a parameter encoding control portion 1121, a merge prediction portion 30374, a sub-block prediction portion (affine prediction portion) 30372, a DMVR portion 30375, an MMVD prediction portion 30376, a triangle prediction portion 30377, an AMVP prediction parameter derivation portion 3032, and a subtraction portion 1123. The merge prediction portion 30374 has a merge prediction parameter derivation portion 3036. The parameter encoding control portion 1121 includes a merge index derivation portion 11211 and a vector candidate index derivation portion 11212. In addition, the parameter encoding control portion 1121 derives merge_idx, affine_flag, base_candidate_idx, distance_idx, direction_idx, etc., by means of the merge index derivation portion 11211, and derives mvpLX, etc., by means of the vector candidate index derivation portion 11212. The merge prediction parameter derivation portion 3036, the AMVP prediction parameter derivation portion 3032, the affine prediction portion 30372, the MMVD prediction portion 30376, and the triangle prediction portion 30377 may also be collectively referred to as a motion vector derivation portion (motion vector derivation device). The parameter encoding portion 112 outputs the motion vectors (mvLX, subMvLX), the reference picture index refIdxLX, the inter-frame prediction identifier inter_pred_idc, or information denoting the same to the prediction image generation portion 101. In addition, the parameter encoding portion 112 outputs merge_flag, skip_flag, merge_idx, inter_pred_idc, refIdxLX, mvp_1X_idx, mvdLX, amvr_mode, and affine_flag to the entropy encoding portion 104.

The merge index derivation portion 11211 derives the merge index merge_idx, and outputs the same to the merge prediction parameter derivation portion 3036 (merge prediction portion). The vector candidate index derivation portion 11212 derives the prediction vector index mvp_1X_idx.

The merge prediction parameter derivation portion 3036 derives the inter-frame prediction parameter on the basis of the merge index merge_idx.

The AMVP prediction parameter derivation portion 3032 derives the prediction vector mvpLX on the basis of the motion vector mvLX. The AMVP prediction parameter derivation portion 3032 outputs the prediction vector mvpLX to the subtraction portion 1123. It should be noted that the reference picture index refIdxLX and the prediction vector index mvp_1X_idx are outputted to the entropy encoding portion 104.

The affine prediction portion 30372 derives the inter-frame prediction parameters (affine prediction parameter) of the sub-block.

The subtraction portion 1123 subtracts the prediction vector mvpLX serving as an output of the AMVP prediction parameter derivation portion 3032 from the motion vector mvLX inputted by the encoding parameter determination portion 110 to generate a difference vector mvdLX. The difference vector mvdLX is outputted to the entropy encoding portion 104.

The addition portion 106 adds the pixel value of the prediction image of the block inputted from the prediction image generation portion 101 to the prediction error inputted from the inverse quantization/inverse transform portion 105 for each pixel so as to generate a decoded image. The addition portion 106 stores the generated decoded image in the reference picture memory 109.

The loop filter 107 performs de-blocking filtering, SAO, and ALF on the decoded image generated by the addition portion 106. It should be noted that the loop filter 107 does not necessarily include the above three filters, for example, the loop filter 107 may include only a de-blocking filter.

The prediction parameter memory 108 stores the prediction parameters generated by the encoding parameter determination portion 110 in a predefined position for each object picture and each CU.

The reference picture memory 109 stores the decoded image generated by the loop filter 107 in a predefined position for each object picture and each CU.

The encoding parameter determination portion 110 selects one of a plurality of sets of encoding parameters. The encoding parameters refer to the aforementioned QT, BT, or TT splitting information, prediction parameters, or parameters generated in association with the same and serving as encoding objects. The prediction image generation portion 101 uses these encoding parameters to generate the prediction image.

The encoding parameter determination portion 110 calculates an RD cost value denoting an information size and the encoding error for each of the plurality of sets. The encoding parameter determination portion 110 selects a set of encoding parameters having a lowest calculated cost value. Therefore, the entropy encoding portion 104 uses the selected set of encoding parameters as the encoded stream Te, and outputs the same. The encoding parameter determination portion 110 stores the determined encoding parameters in the prediction parameter memory 108.

It should be noted that a part of the moving image encoding device 11 and the moving image decoding device 31 in the above embodiment, for example, the entropy decoding portion 301, the parameter decoding portion 302, the loop filter 305, the prediction image generation portion 308, the inverse quantization/inverse transform portion 311, the addition portion 312, the prediction image generation portion 101, the subtraction portion 102, the transform/quantization portion 103, the entropy encoding portion 104, the inverse quantization/inverse transform portion 105, the loop filter 107, the encoding parameter determination portion 110, and the parameter encoding portion 111 can be implemented by means of a computer. In this case, it can be implemented by recording a program for implementing the control function in a computer-readable recording medium and causing a computer system to read and execute the program recorded in the recording medium. It should be noted that the described "computer system" refers to a computer system built in any one of the moving image encoding device 11 and the moving image decoding device 31 and including an OS and hardware such as a peripheral apparatus. In addition, the "computer-readable recording medium" refers to a removable medium such as a floppy disk, a magneto-optical disk, an ROM, and a CD-ROM and a storage device such as a hard disk built in the computer system. Moreover, the "computer-readable recording medium" may also include a recording medium for dynamically storing a program for a short time period such as a communication line used to transmit a program over a network such as the Internet or over a telecommunication line such as a telephone line, and may also include a recording medium for storing a program for a fixed time period such as a volatile memory in the computer system for functioning as a server or a client in such a case. In addition, the program described above may be a program for implementing a part of the functions described above, and may also be a program capable of implementing the functions described above in combination with a program already recorded in the computer system.

In addition, the moving image encoding device 11 and the moving image decoding device 31 in the above embodiment may be partially or completely implemented as integrated circuits such as Large Scale Integration (LSI) circuits. The functional blocks of the moving image encoding device 11 and the moving image decoding device 31 may be individually implemented as processors, or may be partially or completely integrated into a processor. In addition, the circuit integration method is not limited to LSI, and the integrated circuits may be implemented as dedicated circuits or a general-purpose processor. In addition, with advances in semiconductor technology, a circuit integration technology with which LSI is replaced appears, and therefore an integrated circuit based on the technology may also be used.

An embodiment of the present invention has been described in detail above with reference to the accompanying drawings; however, the specific configuration is not limited to the above embodiment, and various amendments can be made to a design without departing from the scope of the gist of the present invention.

APPLICATION EXAMPLES

The moving image encoding device 11 and the moving image decoding device 31 described above can be used in a state of being mounted on various devices for transmitting, receiving, recording, and reproducing a moving image. It should be noted that the moving image may be a natural moving image captured by a video camera or the like, or may be an artificial moving image (including CG and GUI) generated by means of a computer or the like.

Figure 2:
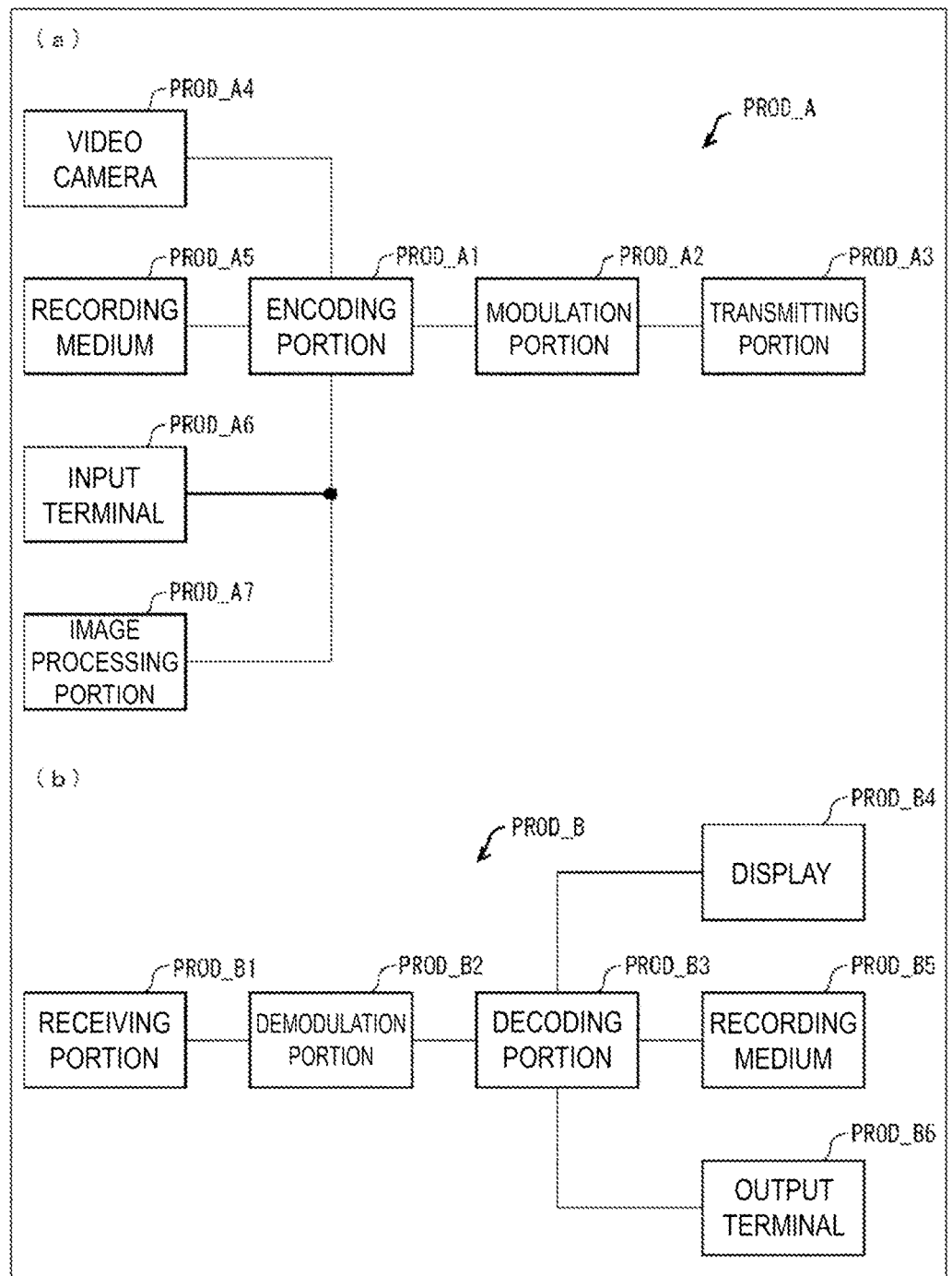
FIG. 2 is a diagram showing components of a transmitting device equipped with a moving image encoding device according to this embodiment and components of a receiving device equipped with a motion image decoding device according to this embodiment. (a) of FIG. 2 shows a transmitting device equipped with a moving image encoding device, and (b) of FIG. 2 shows a receiving device equipped with a moving image decoding device.

Firstly, with reference to FIG. 2, a description of that the moving image encoding device 11 and the moving image decoding device 31 described above can be used to transmit and receive the moving image is provided.

(a) of FIG. 2 is a block diagram showing components of a transmitting device PROD_A equipped with the moving image encoding device 11. As shown in (a) of FIG. 2, the transmitting device PROD_A includes: an encoding portion PROD_A1 for acquiring encoded data by encoding the moving image, a modulation portion PROD_A2 for acquiring a modulation signal by using the encoded data acquired by the encoding portion PROD_A1 to modulate a carrier, and a transmitting portion PROD_A3 for transmitting the modulation signal acquired by the modulation portion PROD_A2. The moving image encoding device 11 described above is used as the encoding portion PROD_A1.

As a source for providing the moving image inputted to the encoding portion PROD_A1, the transmitting device PROD_A may further include: a video camera PROD_A4 for capturing a moving image, a recording medium PROD_A5 on which the moving image is recorded, an input terminal PROD_A6 for inputting a moving image from the external, and an image processing portion A7 for generating or processing an image. (a) of FIG. 2 exemplarily shows that the transmitting device PROD_A includes all of these components, but a part of these components can be omitted.

It should be noted that the recording medium PROD_A5 may be a medium on which a moving image not encoded is recorded, or may be a medium on which a moving image encoded by using an encoding method for recording different from the encoding method for transmission is recorded. In the latter case, a decoding portion (not shown) for decoding, according to the encoding method for recording, the encoded data read from the recording medium PROD_A5 may be provided between the recording medium PROD_A5 and the encoding portion PROD_A1.

(b) of FIG. 2 is a block diagram showing components of a receiving device PROD_B equipped with the moving image decoding device 31. As shown in (b) of FIG. 2, the receiving device PROD_B includes: a receiving portion PROD_B1 for receiving the modulation signal, a demodulation portion PROD_B2 for acquiring the encoded data by demodulating the modulation signal received by the receiving portion PROD_B1, and a decoding portion PROD_B3 for acquiring the moving image by decoding the encoded data acquired by the demodulation portion PROD_B2. The moving image decoding device 31 described above is used as the decoding portion PROD_B3.

The receiving device PROD_B serves as a destination of provision of the moving image outputted by the decoding portion PROD_B3, and may further include a display PROD_B4 for displaying the moving image, a recording medium PROD_B5 for recording the moving image, and an output terminal PROD_B6 for outputting the moving image to the external. (b) of FIG. 2 exemplarily shows that the receiving device PROD_B includes all of these components, but a part of these components can be omitted.

It should be noted that the recording medium PROD_B5 may be a medium on which a moving image not encoded is recorded, or may be a medium on which a moving image encoded by using an encoding method for recording different from the encoding method for transmission is recorded. In the latter case, an encoding portion (not shown) for encoding, according to the encoding method for recording, the moving image acquired from the decoding portion PROD_B3 may be provided between the decoding portion PROD_B3 and the recording medium PROD_B5.

It should be noted that a transmission medium for transmitting the modulation signal may be wireless or wired. In addition, a transmission scheme for transmitting the modulation signal may be broadcasting (here, referred to a transmission scheme of which the transmission destination is not determined in advance) or communication (here, referred to a transmission scheme of which the transmission destination is determined in advance). That is, transmission of the modulation signal may be implemented by means of any one of wireless broadcasting, wired broadcasting, wireless communication, and wired communication.

For example, a broadcast station (broadcast apparatus and the like)/receiving station (television receiver and the like) of digital terrestrial broadcasting is an example of the transmitting device PROD_A/receiving device PROD_B transmitting or receiving the modulation signal by means of wireless broadcasting. In addition, a broadcast station (broadcast apparatus and the like)/receiving station (television receiver and the like) of cable television broadcasting is an example of the transmitting device PROD_A/receiving device PROD_B transmitting or receiving the modulation signal by means of wired broadcasting.

In addition, a server (workstation and the like)/client (television receiver, personal computer, smart phone, and the like) using a Video On Demand (VOD) service and a moving image sharing service on the Internet is an example of the transmitting device PROD_A/receiving device PROD_B transmitting or receiving the modulation signal by means of communication (generally, a wireless or wired transmission medium is used in LAN, and a wired transmission medium is used in WAN). Here, the personal computer includes a desktop PC, a laptop PC, and a tablet PC. In addition, the smart phone also includes a multi-functional mobile phone terminal.

It should be noted that the client using the moving image sharing service has a function for decoding encoded data downloaded from the server and displaying the same on a display and a function for encoding a moving image captured by a video camera and uploading the same to the server. That is, the client using the moving image sharing service functions as both the transmitting device PROD_A and the receiving device PROD_B.

Figure 3:
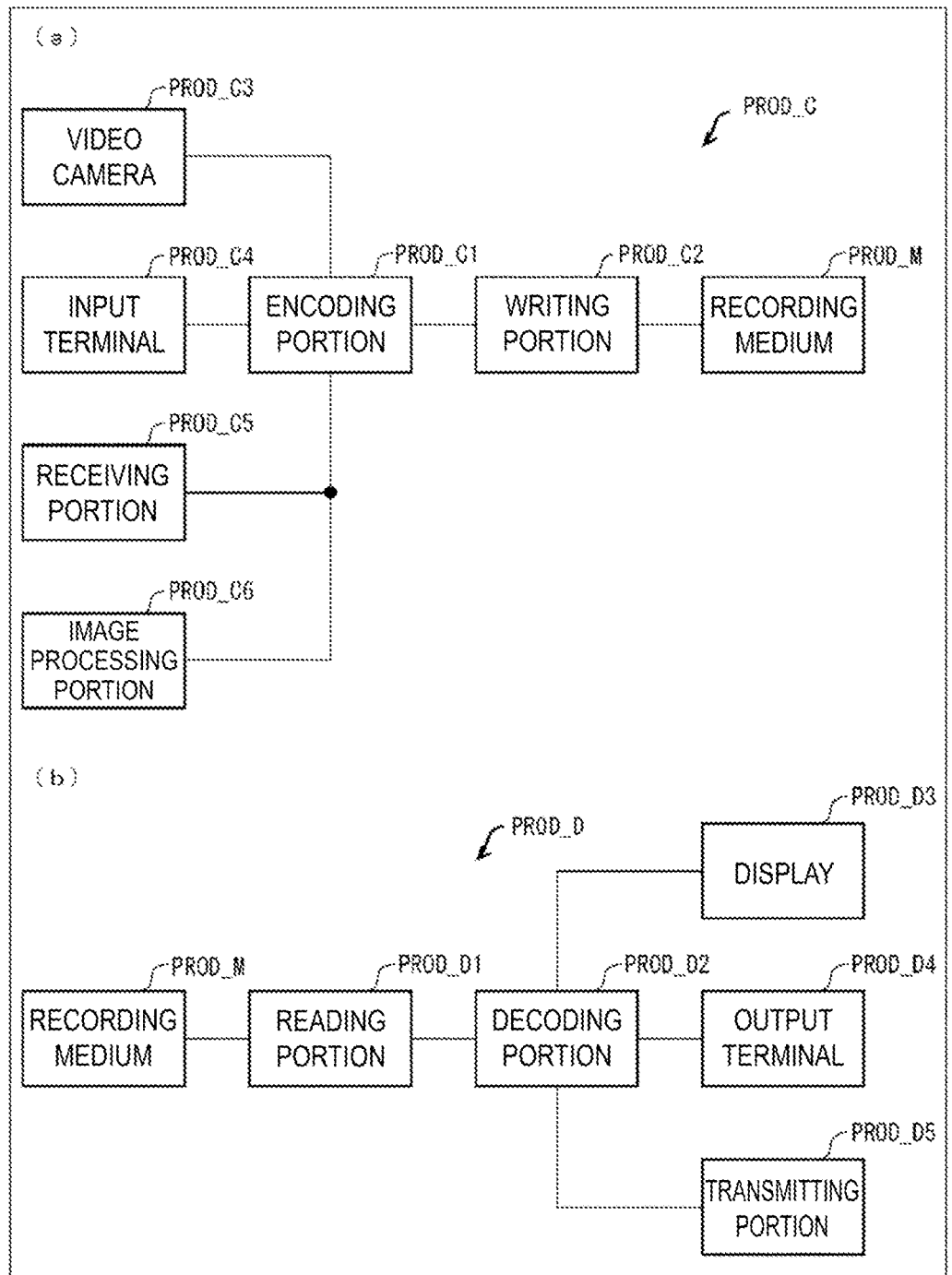
FIG. 3 is a diagram showing components of a recording device equipped with a moving image encoding device according to this embodiment and a reproducing device equipped with a moving image decoding device according to this embodiment. (a) of FIG. 3 shows a recording device equipped with a moving image encoding device, and (b) of FIG. 3 shows a reproducing device equipped with a moving image decoding device.

Next, with reference to FIG. 3, a description of that the moving image encoding device 11 and the moving image decoding device 31 described above can be used to record and reproduce the moving image is provided.

(a) of FIG. 3 is a block diagram showing components of a recording device PROD_C equipped with the moving image encoding device 11 described above. As shown in (a) of FIG. 3, the recording device PROD_C includes: an encoding portion PROD_C1 for acquiring encoded data by encoding the moving image and a writing portion PROD_C2 for writing the encoded data acquired by the encoding portion PROD_C1 in a recording medium PROD_M. The moving image encoding device 11 described above is used as the encoding portion PROD_C1.

It should be noted that the recording medium PROD_M may be (1) a recording medium built in the recording device PROD_C such as a Hard Disk Drive (HDD) and a Solid State Drive (SSD), may also be (2) a recording medium connected to the recording device PROD_C such as an SD memory card and a Universal Serial Bus (USB) flash memory, and may also be (3) a recording medium loaded into a drive device (not shown) built in the recording device PROD_C such as a Digital Versatile Disc (DVD, registered trademark) and a Blu-ray Disc (BD, registered trademark).

In addition, as a source for providing the moving image inputted to the encoding portion PROD_C1, the recording device PROD_C may further include: a video camera PROD_C3 for capturing a moving image, an input terminal PROD_C4 for inputting a moving image from the external, a receiving portion PROD_C5 for receiving a moving image, and an image processing portion PROD_C6 for generating or processing an image. (a) of FIG. 3 exemplarily shows that the recording device PROD_C includes all of these components, but a part of these components can be omitted.

It should be noted that the receiving portion PROD_C5 can receive an un-encoded moving image, and can also receive encoded data encoded by using an encoding method for transmission different from the encoding method for recording. In the latter case, a decoding portion for transmission (not shown) for decoding the encoded data encoded by using the encoding method for transmission may be provided between the receiving portion PROD_C5 and the encoding portion PROD_C1.

Examples of such recording device PROD_C include: a DVD recorder, a BD recorder, a Hard Disk Drive (HDD) recorder, etc. (in this case, the input terminal PROD_C4 or the receiving portion PROD_C5 is a main source for providing the moving image). In addition, a portable video camera (in this case, the video camera PROD_C3 is the main source for providing the moving image), a personal computer (in this case, the receiving portion PROD_C5 or the image processing portion C6 is the main source for providing the moving image), and a smart phone (in this case, the video camera PROD_C3 or the receiving portion PROD_C5 is the main source for providing the moving image) are also included in the examples of such recording device PROD_C.

(b) of FIG. 3 is a block diagram showing components of a reproducing device PROD_D equipped with the moving image decoding device 31 described above. As shown in (b) of FIG. 3, the reproducing device PROD_D includes: a reading portion PROD_D1 for reading the encoded data having been written in the recording medium PROD_M and a decoding portion PROD_D2 for acquiring the moving image by decoding the encoded data read by the reading portion PROD_D1. The moving image decoding device 31 described above is used as the decoding portion PROD_D2.

It should be noted that the recording medium PROD_M may be (1) a recording medium built in the reproducing device PROD_D such as an HDD and an SSD, may also be (2) a recording medium connected to the reproducing device PROD_D such as an SD memory card and a USB flash memory, and may also be (3) a recording medium loaded into a drive device (not shown) built in the reproducing device PROD_D such as a DVD and a BD.

In addition, as a destination of provision of the moving image outputted by the decoding portion PROD_D2, the reproducing device PROD_D may further include: a display PROD_D3 for displaying the moving image, an output terminal PROD_D4 for outputting the moving image to the external, and a transmitting portion PROD_D5 for transmitting the moving image. (b) of FIG. 3 exemplarily shows that the reproducing device PROD_D includes all of these components, but a part of these components can be omitted.

It should be noted that the transmitting portion PROD_D5 can transmit an un-encoded moving image, and can also transmit encoded data encoded by using an encoding method for transmission different from the encoding method for recording. In the latter case, an encoding portion (not shown) for encoding the moving image by using the encoding method for transmission may be provided between the decoding portion PROD_D2 and the transmitting portion PROD_D5.

Examples of such reproducing device PROD_D include a DVD player, a BD player, an HDD player, and the like (in this case, the output terminal PROD_D4 connected to a television receiver and the like is a main destination of provision of the moving image). In addition, a television receiver (in this case, the display PROD_D3 is the main destination of provision of the moving image), a digital signage (also referred to as an electronic signage or an electronic bulletin board, and the display PROD_D3 or the transmitting portion PROD_D5 is the main destination of provision of the moving image), a desktop PC (in this case, the output terminal PROD_D4 or the transmitting portion PROD_D5 is the main destination of provision of the moving image), a laptop or tablet PC (in this case, the display PROD_D3 or the transmitting portion PROD_D5 is the main destination of provision of the moving image), and a smart phone (in this case, the display PROD_D3 or the transmitting portion PROD_D5 is the main destination of provision of the moving image) are also included in the examples of such reproducing device PROD_D.

(Hardware Implementation and Software Implementation)

In addition, the blocks in the moving image decoding device 31 and the moving image encoding device 11 described above may be implemented by hardware by using a logic circuit formed on an integrated circuit (IC chip), or may be implemented by software by using a Central Processing Unit (CPU).

In the latter case, the devices described above include: a CPU for executing commands of a program for implementing the functions, a Read Only Memory (ROM) for storing the program, a Random Access Memory (RAM) for loading the program, and a storage device (storage medium) such as a memory for storing the program and various data. The objective of the embodiments of the present invention can be attained by performing the following: software for implementing the functions described above, namely program code of a control program for the above devices (executable program, intermediate code program, source program), is recoded in a recording medium in a computer-readable manner, the recording medium is provided to the above devices, and the computer (or CPU or MPU) reads the program code recorded in the recording medium and executes the same.

Examples of the recording medium described above include: tapes such as a magnetic tape and a cassette tape, disks or discs including a magnetic disk such as a floppy disk (registered trademark)/hard disk and an optical disc such as a Compact Disc Read-Only Memory (CD-ROM)/Magneto-Optical (MO) disc/Mini Disc (MD)/Digital Versatile Disc (DVD, registered trademark)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM)/flash ROM, or logic circuits such as a Programmable logic device (PLD) and a Field Programmable Gate Array (FPGA).

In addition, the devices described above may also be configured to be connectable to a communication network and to be provided with the above program code by means of the communication network. The communication network is not specifically limited as long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a virtual private network, a telephone network, a mobile communication network, a satellite communication network, and the like can be used. In addition, transmission media forming the communication network are not limited to a specific configuration or type as long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL) or a wireless medium such as an infrared-ray including Infrared Data Association (IrDA) and a remote controller, Bluetooth (registered trademark), IEEE 802.11 wireless communication, High Data Rate (HDR), Near Field Communication (NFC), Digital Living Network Alliance (DLNA, registered trademark), a mobile telephone network, a satellite circuit, and a terrestrial digital broadcast network can also be used. It should be noted that the embodiments of the present invention may also be implemented in a form of a computer data signal embedded in a carrier wave in which the above program code is embodied by electronic transmission.

The embodiments of the present invention are not limited to the above embodiments, and can be variously modified within the scope of the claims. That is, embodiments acquired by combining technical solutions which are adequately modified within the scope of the claims are also included in the technical scope of the present invention.

INDUSTRIAL APPLICABILITY

Embodiments of the present invention can be preferably applied to a moving image decoding device for decoding encoded data acquired by encoding image data and a moving image encoding device for generating encoded data acquired by encoding image data. In addition, embodiments of the present invention can be preferably applied to a data structure of the encoded data generated by the moving image encoding device and referred to by the moving image decoding device.

CROSS-REFERENCE TO RELATED APPLICATIONS

The present application claims priority to Japanese Patent Application JP 2018-232640 filed on Dec. 12, 2018 and Japanese Patent Application JP 2019-000704 filed on Jan. 7, 2019, which are incorporated in the specification by reference in their entireties.

REFERENCE NUMERAL LIST

31 Image decoding device
301 Entropy decoding portion
302 Parameter decoding portion
3020 Header decoding portion
303 Inter-frame prediction parameter decoding portion
304 Intra-frame prediction parameter decoding portion
308 Prediction image generation portion
309 Inter-frame prediction image generation portion
310 Intra-frame prediction image generation portion
311 Inverse quantization/inverse transform portion
312 Addition portion
11 Image encoding device 101 Prediction image generation portion
102 Subtraction portion
103 Transform/quantization portion
104 Entropy encoding portion
105 Inverse quantization/inverse transform portion
107 Loop filter
110 Encoding parameter determination portion
111 Parameter encoding portion
112 Inter-frame prediction parameter encoding portion
113 Intra-frame prediction parameter encoding portion
1110 Header encoding portion
1111 CT information encoding portion
1112 CU encoding portion (prediction mode encoding portion)
1114 TU encoding portion
30954 BIO portion
309541 L0, L1 prediction image generation portion
309542 Gradient image generation portion
309543 Relevant parameter calculation portion
309544 Motion compensation correction value derivation portion
309545 Bidirectional prediction image generation portion

What is claimed is:

1. A prediction image generation device for generating prediction images, the prediction image generation device comprising:
prediction image generation circuitry generating a first prediction image and a second prediction image;
gradient image generation circuitry performing bidirectional prediction gradient change prediction processing by:
generating a first gradient image by calculating a first difference value of two horizontally neighboring samples of each of a plurality of current samples of the first prediction image and right shifting the first difference value by a first shift value of six;
generating a second gradient image by calculating a second difference value of two vertically neighboring samples of each of the plurality of current samples of the first prediction image and right shifting the second difference value by the first shift value;
generating a third gradient image by calculating a third difference value of two horizontally neighboring samples of each of a plurality of current samples of the second prediction image and right shifting the third difference value by the first shift value; and
generating a fourth gradient image by calculating a fourth difference value of two vertically neighboring samples of each of the plurality of current samples of the second prediction image and right shifting the fourth difference value by the first shift value;
motion compensation correction value derivation circuitry that:
uses the first prediction image, the second prediction image, and a second shift value of four to generate a first intermediate image;
uses the first gradient image, the third gradient image, and a third shift value of one to generate a second intermediate image;
uses the second gradient image, the fourth gradient image, and the third shift value to generate a third intermediate image;
uses the first intermediate image, the second intermediate image, and the third intermediate image to derive motion information; and
uses the motion information, the first gradient image, the second gradient image, the third gradient image, and the fourth gradient image to derive a motion compensation correction value; and
prediction image generation circuitry that uses the first prediction image, the second prediction image, and the motion compensation correction value to generate a third prediction image,
wherein the first shift value, the second shift value, and the third shift value are derived based on a pixel bit length bitDepth of eight.

2. The prediction image generation device according to claim 1, wherein the motion compensation correction value derivation uses a first threshold of 16 to derive the motion information.

3. A moving image decoding device comprising the prediction image generation device according to claim 1, wherein an encoding object image is restored by adding a residual image to or subtracting the residual image from the generated third prediction image.

4. A moving image encoding device comprising the prediction image generation device according to claim 1, wherein a residual of the generated prediction image and an encoding object image is encoded.

5. A prediction image generation method for generating prediction images, the prediction image generation method comprising:
generating a first prediction image and a second prediction image; and
performing bidirectional prediction gradient change prediction processing by:
generating a first gradient image by calculating a first difference value of two horizontally neighboring samples of each of a plurality of current samples of the first prediction image and right shifting the first difference value by a first shift value of six;
generating a second gradient image by calculating a second difference value of two vertically neighboring samples of each of the plurality of current samples of the first prediction image and right shifting the second difference value by the first shift value;
generating a third gradient image by calculating a third difference value of two horizontally neighboring samples of each of a plurality of current samples of the second prediction image and right shifting the third difference value by the first shift value;
generating a fourth gradient image by calculating a fourth difference value of two vertically neighboring samples of each of the plurality of current samples of the second prediction image and right shifting the fourth difference value by the first shift value;
using the first prediction image, the second prediction image, and a second shift value of four to generate a first intermediate image;
using the first gradient image, the third gradient image, and a third shift value of one to generate a second intermediate image;
using the second gradient image, the fourth gradient image, and the third shift value to generate a third intermediate image;
using the first intermediate image, the second intermediate image, and the third intermediate image to derive motion information;
using the motion information, the first gradient image, the second gradient image, the third gradient image, and the fourth gradient image to derive a motion compensation correction value; and using the first prediction image, the second prediction image, and the motion compensation correction value to generate a third prediction image,
wherein the first shift value, the second shift value, and the third shift value are derived based on a pixel bit length bitDepth of eight.

6. The prediction image generation method according to claim 5, further comprising:
using a first threshold of 16 to derive the motion information.

* * * * *